United States Patent
Sakemi et al.

(10) Patent No.: US 9,614,822 B2
(45) Date of Patent: Apr. 4, 2017

(54) NODE DEVICE, COMMUNICATION METHOD AND NETWORK SYSTEM

(71) Applicant: FUJITSU LIMITED, Kawasaki-shi, Kanagawa (JP)

(72) Inventors: Yumi Sakemi, Kawasaki (JP); Tetsuya Izu, London (GB)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 14/600,394

(22) Filed: Jan. 20, 2015

(65) Prior Publication Data

US 2015/0134964 A1 May 14, 2015

Related U.S. Application Data

(63) Continuation of application No. PCT/JP2012/004674, filed on Jul. 23, 2012.

(51) Int. Cl.
```
H04L 9/08      (2006.01)
H04L 29/06     (2006.01)
H04W 84/18     (2009.01)
H04W 12/04     (2009.01)
```

(52) U.S. Cl.
CPC .......... *H04L 63/065* (2013.01); *H04W 12/04* (2013.01); *H04W 84/18* (2013.01)

(58) Field of Classification Search
CPC ... H04L 63/065; H04L 63/061; H04L 9/0833; H04W 12/04
USPC .................................. 713/171; 380/277–279
See application file for complete search history.

(56) References Cited

U.S. PATENT DOCUMENTS

2003/0211842 A1  11/2003  Kempf et al.
2011/0164750 A1   7/2011  Maas et al.

FOREIGN PATENT DOCUMENTS

| JP | 2003-324419 | 11/2003 |
| JP | 2012-503356 | 2/2012 |
| WO | WO 2007/018296 A1 | 2/2007 |
| WO | WO 2007/049467 A1 | 5/2007 |
| WO | WO 2010/053863 A2 | 5/2010 |

OTHER PUBLICATIONS

Chan et al., "PIKE: Peer Intermediaries for Key Establishment in Sensor Networks", Proceedings of IEEE INFOCOM 2005, 2005, pp. 524-535.*

(Continued)

*Primary Examiner* — Alexander Lagor
(74) *Attorney, Agent, or Firm* — Staas & Halsey LLP

(57) ABSTRACT

A node device in a network system includes a memory and a processor. The node device is identified with a first value related to a first element and a second value related to a second element. The memory stores a first key corresponding to the first value, a second key corresponding to the second value, first information on a first range of values and second information on a second range of values, at least one of the first key and the second key being shared by at least three or more node devices in the network system. The processor communicates with one of at least three or more node devices indicated by the first value related to the first element and the second value related to the second element using one of the first key and the second key.

15 Claims, 21 Drawing Sheets

(56) References Cited

OTHER PUBLICATIONS

Eschenauer et al., "A Key-Management Scheme for Distributed Sensor Networks", Proceedings of the *9th ACM Conference on Computer and Communications Security (CCS '02)*, Nov. 18-22, 2002, pp. 41-47.
Chan et al., "PIKE: Peer Intermediaries for Key Establishment in Sensor Networks", Proceedings of *IEEE INFOCOM 2005*, Mar. 13-17, 2005, pp. 524-535.
International Search Report mailed Oct. 23, 2012, in corresponding International Patent Application No. PCT/JP2012/004674.
U.S. Appl. No. 14/600,383, filed Jan. 20, 2015, Tetsuya Izu et al., Fujitsu Limited.

\* cited by examiner

FIG. 1

|  | i=0 | i=1 | i=2 |
|---|---|---|---|
| j=0 | A (0,0)<br>KEY AD、KEY AG<br>KEY AB、KEY AC | D (1,0)<br>KEY AD、KEY DG<br>KEY DE、KEY DF | G (2,0)<br>KEY AG、KEY DG<br>KEY GH、KEY GI |
| j=1 | B (0,1)<br>KEY BE、KEY BH<br>KEY AB、KEY BC | E (1,1)<br>KEY BE、KEY EH<br>KEY DE、KEY EF | H (2,1)<br>KEY BH、KEY EH<br>KEY GH、KEY HI |
| j=2 | C (0,2)<br>KEY CF、KEY CI<br>KEY AC、KEY BC | F (1,2)<br>KEY CF、KEY FI<br>KEY DF、KEY FE | I (2,2)<br>KEY CI、KEY FI<br>KEY GI、KEY HI |

FIG. 3

|  | i=0 | i=1 | i=2 | i=3 |
|---|---|---|---|---|
| j=0 | (0,0) KEY K0、KEY L0 | (1,0) KEY K1、KEY L0 | (2,0) KEY K2、KEY L0 | (3,0) KEY K3、KEY L0 |
| j=1 | (0,1) KEY K0、KEY L1 | (1,1) KEY K1、KEY L1 | (2,1) KEY K2、KEY L1 | (3,1) KEY K3、KEY L1 |
| j=2 | (0,2) KEY K0、KEY L2 | (1,2) KEY K1、KEY L2 | (2,2) KEY K2、KEY L2 | (3,2) KEY K3、KEY L2 |

FIG. 4

|  | i=0 | i=1 | i=2 | i=3 |
|---|---|---|---|---|
| j=0 | (0,0)<br>KEY K0、KEY L0 | (1,0)<br>KEY K1、KEY L0 | (2,0)<br>KEY K2、KEY L0 | (3,0)<br>KEY K3、KEY L0 |
| j=1 | (0,1)<br>KEY K0、KEY L1 | (1,1)<br>KEY K1、KEY L1 | (2,1)<br>KEY K2、KEY L1 | (3,1)<br>KEY K3、KEY L1 |
| j=2 | (0,2)<br>KEY K0、KEY L2 | (1,2)<br>KEY K1、KEY L2 | (2,2)<br>KEY K2、KEY L2 | (3,2)<br>KEY K3、KEY L2 |
| j=3 | (0,3)<br>KEY K0、KEY L3 | (1,3)<br>KEY K1、KEY L3 | (2,3)<br>KEY K2、KEY L3 | (3,3)<br>KEY K3、KEY L3 |

FIG. 9

| GLOBAL TRANSMISSION DESTINATION ADDRESS | GLOBAL TRANSMISSION DESTINATION ID | LOCAL TRANSMISSION DESTINATION ADDRESS | LOCAL TRANSMISSION DESTINATION ID | EVALUATION VALUE |
|---|---|---|---|---|
| ADDRESS OF SN | (2,0) | ADDRESS OF Nd | (2,1) | 70 |
| ADDRESS OF SN | (2,0) | ADDRESS OF Ng | (3,0) | 30 |
| ... | ... | ... | ... | ... |
| ADDRESS OF Nh | (3,2) | ADDRESS OF Nh | (3,2) | 60 |
| ADDRESS OF Nh | (3,2) | ADDRESS OF Nc | (1,1) | 20 |
| ... | ... | ... | ... | ... |
| ADDRESS OF Ng | (3,0) | ADDRESS OF Ng | (3,0) | 60 |
| ADDRESS OF Ng | (3,0) | ADDRESS OF Nh | (3,2) | 40 |
| ... | ... | ... | ... | ... |

FIG. 10A

| MINIMUM VALUE | MAXIMUM VALUE |
|---|---|
| 0 | m-1 |

FIG. 10B

| MINIMUM VALUE | MAXIMUM VALUE |
|---|---|
| 0 | n-1 |

FIG. 11

| SHARING DESTINATION ID | COMMON KEY |
|---|---|
| (3,0) | M1 |
| (2,0) | M2 |

FIG. 13

| FIRST ELEMENT VALUE | PRE-SHARED KEY |
|---|---|
| 0 | K0 |
| 1 | K1 |
| 2 | K2 |
| ... | ... |

NODE DEVICE, COMMUNICATION METHOD AND NETWORK SYSTEM

CROSS-REFERENCE TO RELATED APPLICATION

This application is a continuation application of International Application PCT/JP2012/004674 filed on Jul. 23, 2012, the entire contents of which are incorporated herein by reference.

FIELD

The embodiment discussed herein is related to encrypted communications between nodes in a network system.

BACKGROUND

An ad-hoc network has been known as a type of a network. The ad-hoc network is a self-configured network which links by wireless communications. The ad-hoc network is configured by a plurality of devices having a communication function. A device having the communication function in the ad-hoc network is referred to as a node.

Each node in the ad-hoc network transmits or receives a packet with a multi-hop communication. The multi-hop communication is a technology that enables nodes, which are not present in their counterparts' service areas, to communicate with each other through a different node being present in the service area of each node. Note that a path to transfer a packet from a start point to an end point by the multi-hop communication is referred to as a transfer path. A transfer path is formed by a plurality of nodes being present from the start point to the end point.

For example, a meter-reading system has been known as a sensor network system of an ad-hoc type. A node capable of wireless communications is incorporated into a wattmeter of each household, and this meter-reading system gathers consumed electric energy and the like of each household, by way of the ad-hoc network. In this meter-reading system, packets containing information on consumed electric energy of each household which has been detected by each wattmeter are transferred from each node with which a wattmeter of each household is provided to a system of a power company.

From a standpoint of security, it is desirable that data in a packet is encrypted. For example, it is desirable that a data transmission source transmits data to a transmission destination after encrypting the data using a key for data encryption.

For example, a common key encryption method has been known as data encryption. In the common key encryption method, a data transmission source and a data transmission destination share a key for data encryption. To share this key, a conventional technology using Pairwise Key which is distributed in advance to each node has been known.

In this conventional technology, an ID (x, y) is assigned in advance to each node in a sensor network, and a plurality of Pairwise Keys corresponding to IDs are distributed. Then, using a Pairwise Key to be shared only between two nodes, the data transmission source and the data receipt destination share the key for data encryption.

As a conventional technology, Haowen Chan, Adrian Perrig, "PIKE: Peer Intermediaries for Key Establishment in Sensor Networks" (IEEE, IEEE INFOCOM 2005, pp. 524-535) has been known, for example.

In the conventional sensor network, m-squared nodes are first virtually arranged in a matrix of m rows by m columns. Then, an ID (i, j) containing two elements of a row and a column is assigned to each node. Note that a key for encryption of data in a packet is hereinafter referred to as a common key. In addition, a key which is used to share a common key and distributed in advance to each node is hereinafter referred to as a pre-shared key.

FIG. 1 is a view for illustrating a method for distributing a pre-shared key in the conventional sensor network. In FIG. 1, it is assumed that a total of nine nodes are arranged in a matrix of three rows by three columns and an ID is assigned to each node. For example, a node A is assigned an ID of (0, 0) and a node B an ID of (0, 1).

Then, a plurality of pre-shared keys are distributed to each node. The pre-shared key is a key shared by one node and another node having either row or column which is common to the one node.

For example, the node A (0, 0) has a pre-shared key AB with the node B (0, 1). The node A (0, 0) also has a pre-shared key AC with a node C (0, 2). In addition, the node A (0, 0) has a pre-shared key AD with a node D (1, 0). The node A (0, 0) also has a pre-shared key AG with a node G (2, 0). Note that each pre-shared key is a key which is shared only between two nodes and differs from the other pre-shared keys.

When the sensor network including nine nodes is constructed, as illustrated in FIG. 1, four pre-shared keys are distributed in advance to each node.

Since the node A (0, 0) shares the pre-shared key AB with the node B (0, 1), the node A (0, 0) may use the pre-shared key AB to share a common key to be used in encrypted communications with the node B (0, 1). On the one hand, the pre-shared key which the node A (0, 0) has differs from a pre-shared key which a node I (2, 2) has. Thus, the node A (0, 0) uses in the encrypted communications a node which shares a pre-shared key with the node A (0, 0) and which shares a pre-shared key with the node I (2, 2). In the example of FIG. 1, the node A (0, 0) uses the node C (0, 2) or the node G (2, 0) to share a common key used in the encrypted communications with the node C (0, 2).

Now, a case in which a new node is added to the ad-hoc network such as a sensor network is described. When a new node is added in a conventional sensor network, not only is an ID assigned to the new node, but also setting of a pre-shared key to be shared with another node for which either row or column is equal is requested. In addition, a pre-shared key to be shared with the new node is desirable to be distributed to nodes, which are already operating in the sensor network.

For example, suppose that an ID (0, 3) is assigned to a node J when the node J is added to the sensor network including the node A (0, 0) to node I (2, 2) in FIG. 1. Here, a pre-shared key uniquely shared between the node J (0, 3) and the node A (0, 0), a pre-shared key uniquely shared between the node J (0, 3) and the node B (0, 1), and a pre-shared key uniquely shared between the node J (0, 3) and the node C (0, 2) are distributed to the node J (0, 3). In addition, the unique pre-shared keys are desirable to be assigned respectively to the node A (0, 0), the node B (0, 1), and the node C (0, 2) which are already operating.

SUMMARY

According to an aspect of the invention, a node device of a plurality of node devices included in a network system, each of the plurality of node devices being identified with a pair of a value related to a first element and a value related to a second element, the node device being identified with a first value related to the first element and a second value related to the second element, the node device includes: a memory configured to store a first key corresponding to the first value, a second key corresponding to the second value, first information on a first range of values which may be taken for the first element in each of the plurality of node devices and second information on a second range of values which may be taken for the second element in each of the plurality of node devices, at least one of the first key and the second key being shared by at least three or more node devices of the plurality of node devices; and a processor coupled to the memory and configured to: communicate with one of a first other node device and a second other node device using one of the first key and the second key, the first other node device being indicated by the first value related to the first element and a value in the second range related to the second element, and the second other node device being indicated by a value in the first range related to the first element and the second value related to the second element.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a view illustrating a method for distributing a pre-shared key of a conventional technology;

FIG. 3 is a view illustrating a method for distributing a pre-shared key in the example;

FIG. 4 is a view illustrating a possibility of adding a new node to a network system;

FIG. 9 is a view illustrating a data configuration example of a routing table;

FIG. 10A and FIG. 10B are views illustrating a data configuration example of range information;

FIG. 11 is a view illustrating a data configuration example of a common key table;

FIG. 13 is a view illustrating a data configuration example of a management table;

DESCRIPTION OF EMBODIMENT

A method of distributing a new pre-shared key to an existing node in a network system involves troublesome management. For ease of distribution, highly important information of a pre-shared key is distributed to each node in a network system through communications. When the network system uses wireless communications, distribution of a pre-shared key through wireless communications leads to compromise of security, in particular.

Hence, this example aims to provide a technology that enables addition of a new node, as appropriate, to a network system such as an ad-hoc network and the like.

An embodiment of a node, a communication method and a system according to the disclosure is hereinafter described in detail with reference to the accompanying drawings.

Figure 2:
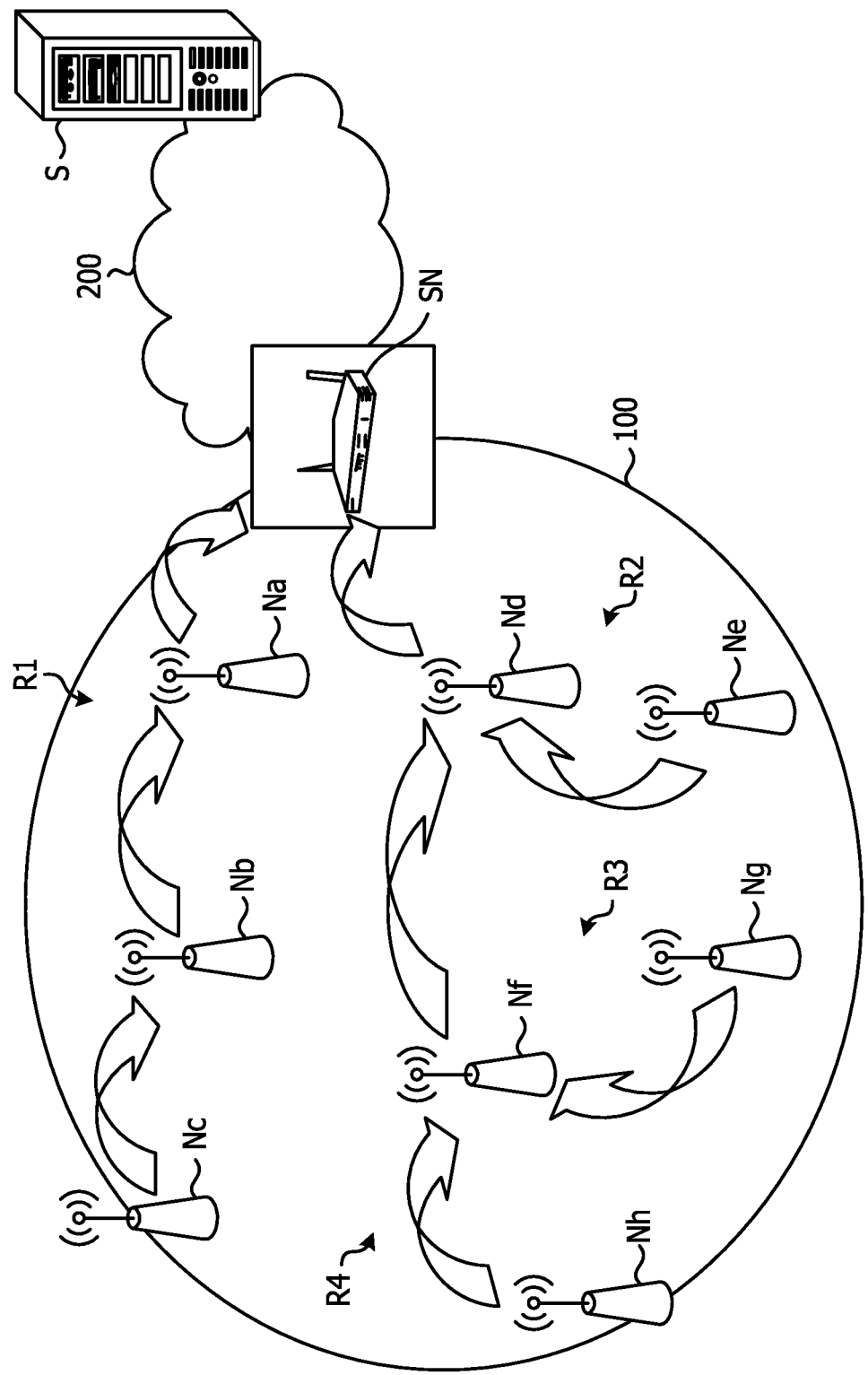
FIG. 2 is a view illustrating one example of a network system according to an embodiment.

FIG. 2 illustrates one example of a network system according to an embodiment. The network system includes a plurality of nodes N, a sink node SN, and a server S. First, the network system according to the embodiment and transmission of a packet in the network system are described with reference to FIG. 2. The network system according to the embodiment is an ad-hoc network system.

Packets flowing through the ad-hoc network include a data packet and a Hello packet. The data packet is a packet to be unicast. The data packet is a packet to transmit data from a start point to an end point along a transport path. The Hello packet is a packet to be broadcasted. The Hello packet is a packet to generate the transport path.

The server S and the sink node SN are coupled by way of a regular network 200 such as an Internet, a LAN, a WAN and the like. The sink node SN and nodes Na to Nh are coupled by way of an ad-hoc network 100. A plurality of nodes N are provided in the ad-hoc network 100. In FIG. 2, the nodes Na to Nh are depicted as representatives of a plurality of nodes.

The server S is a computer configured to manage the ad-hoc network. For example, the server S collects data from each node and accumulates the data. The server S also executes various instructions on the sink node N or the nodes N.

The sink node SN is a relay device coupling the ad-hoc network 100 and the regular network 200. The sink node SN may transmit and receive both information in a protocol form of the ad-hoc network 100 and information in a protocol form of the regular network 200.

In addition, the sink node SN performs communications by protocol-converting the information between the ad-hoc network 100 and the regular network 200. For example, a data packet transmitted to the server S from any of the plurality of nodes N in the ad-hoc network 100 is protocol-converted at the sink node SN. Then, the sink node SN transmitting the data packet to the regular network 200, the data packet reaches the server S.

In addition, after being protocol-converted at the sink node SN, a data packet transmitted from the server S or the sink node SN to each node N is transmitted from the sink node SN to each node N in the ad-hoc network 100.

Each node N is a device capable of communications among the other nodes capable of communication in a predetermined service area. For example, a node Nc transmits or receives a packet with a node Nb according to a routing table generated at the node Nc. A routing table is a table having information on a transfer path. In addition, the nodes N transmit a value acquired from a sensor to the server S by way of the ad-hoc network.

In the ad-hoc network 100, it is not requested that all the nodes Na to Nh are able to directly communicate with the sink node SN. The nodes Na to Nh communicate with the sink node SN by going through another node. Thus, in the ad-hoc network 100, it suffices that some nodes may communicate with the sink node SN. In FIG. 2, the nodes Na, Nd are each a node capable of directly communicating with the sink node SN.

In addition, each node N encrypts at least a part of data in a packet by a common key. A common key is a key to encrypt data in a data packet. In this example, a session key which is changed in every session is used as a common key. Specifically, a common key only shared between a node which is a start point and a node which is an end point in a transport path is used. Use of the common key which varies in each session improves the security of the entire network.

Each node uses a pre-shared key to share a common key. A pre-shared key is a key used to share a common key. A pre-shared key is distributed by a method to be described below before each node forms an ad-hoc network.

A transport path is described hereinafter. Each node N generates a routing table based on information on communication status with surrounding other nodes N. As such, each node generating a routing table, as appropriate, depending on communication status, setting of a new transmission route is enabled even when communications between a node Nf and a node Ng is disabled. For example, the node Ng may construct a new route that goes through a node Ne.

FIG. 2 illustrates an example of a transport path in a case where each node in the ad-hoc network specifies the server S (or the sink node SN) as a final transmission destination and transmits a data packet. FIG. 2 illustrates that four transport paths R1 to R4 are formed at one point in time by the nodes Na to Nh which constitute the ad-hoc network 100. By following the routed transport paths R1 to R4, the nodes Na to Nh transmit to the sink node SN data detected by each of the Nodes Na to Nh.

For example, the transport path R1 is a route including the node Nc, the node Nb, the node Na and the sink node SN. The transport path R2 is a route including the node Ne, the node Nd and the sink node SN. The transport path R3 is a route including the node Ng, the node Nf, the node Nd and the sink node SN. The transport path R4 is a route including the node Nh, the node Nf, the node Nd and the sink node SN.

For example, when the node Nc transmits a data packet to the sink node SN, the node Nc encrypts the data packet using a common key corresponding to the sink node SN. Then, after specifying the sink node SN for a final transmission destination, the node Nc transmits the data packet to the node Nb based on a routing table.

The encrypted data packet goes through the nodes Nb and Na and is received by the sink node SN, which is the final transmission destination. The sink node SN decrypts the data packet generated by the node Nc with the common key which the sink node SN shares with the node Nc. Note that the data packet may be decrypted at the server S rather than at the sink node SN. In that case, the server S manages the common key shared with the node Nc.

In this manner, if the node Nc and the server S (or the sink node SN) share the common key, the node Nc may encrypt a data packet. If a data packet is transmitted to a device with which no common key is shared as a final transmission destination, a node of a transmission source is first requested to share a common key with the device at the final transmission destination. For example, when the node Nc trans-mits a data packet to the node Nb, and if a common key between the node Nc and the node Nb is not shared by the node Nc and the node Nb, the node Nc and the node Nb are requested to share a common key.

In this example, in order to perform encrypted communications between nodes which do not share a common key, a common key is shared through the use of a pre-shared key. In addition, when a common key is mutually shared by nodes which do not share a pre-shared key, the common key is shared by way of a relay node. Details of the sharing of the common key are described below.

FIG. 3 is to illustrate a method for distributing a pre-shared key in this example. A pre-shared key is generated and distributed before nodes form an ad-hoc network.

In addition, a management device generates and distributes a pre-shared key. While the server S may also function as a management device, in the example, the management device is a computer different from the server S.

First, the management device virtually arranges a plurality of nodes in a matrix of m rows by n columns. Note that virtual arrangement may not be associated with arrangement of the nodes when the ad-hoc network is formed, as illustrated in FIG. 2.

Then, the management device assigns an ID to each node. An ID includes a first element and a second element. In this example, the first element is set in rows of the matrix and the second element in columns of the matrix. Each node is identified with a combination of a value of the first element and a value of the second element in an ID. In FIG. 3, the value of the first element is i, the value of the second element is j, and an ID (i, j) is assigned to each node. Note that i is an integer from 0 to m−1 and j is an integer from 0 to n−1.

In addition, the management device generates one pre-shared key for each element value. In FIG. 3, the management device generates a pre-shared key Ki for every value i of the first element and a pre-shared key Lj for every value j of the second element. For example, a pre-shared key K0 is generated for the value "0" of the first element. In addition, a pre-shared key L0 is generated for the value "0" of the second element.

Then, the management device distributes the pre-shared key generated for every element value to each node, depending on the ID assigned to each node. For example, the pre-shared key K0 and the pre-shared key L0 are distributed to the node to which an ID (0, 0) is assigned. The pre-shared keys may be distributed offline.

The nodes to which the management device assigns the ID and the pre-shared key form the ad-hoc network depicted in FIG. 2. For example, if the ID (0, 0) is assigned to the node Nf in FIG. 2, the node Nf has the pre-shared keys K0 and L0. In addition, if an ID (3, 0) is assigned to the node Ng, the node Ng has the pre-shared keys K3 and L0.

Prior to execution of encrypted communications, the node Nf (0, 0) and the node Ng (3, 0) share a common key by using the pre-shared key L0 which both own. This enables the node Nf and the node Ng to use the shared common key to carry out encrypted communications of a data packet.

For example, if an ID (3, 2) is assigned to the node Nh, the node Nh has pre-shared keys K3 and L2. Here, the node Nf (0, 0) and the node Nh (3, 2) do not have a common pre-shared key since any elements of the IDs assigned to the node Nf (0, 0) and the node Nh (3, 2) have no identical element value.

Thus, the node Nf (0, 0) shares a common key with the node Nh (3, 2), the node Nf (0, 0) identifies a relay node which has the pre-shared key K0 or the pre-shared key L0 and which also shares the pre-shared key K3 or the pre-shared key L2 with the counterpart node Nh (3, 2). A node which has a same value as an ID of an own node for one element in the ID and which has a same value as an ID of a counterpart node for the other element of the ID is identified as a relay node. For example, from the ID (0, 0) of the own node and the ID (3, 2) of the counterpart node Nh, the node Nf identifies, as a relay node, a node to which the ID (3, 0) or (0, 2) is assigned.

Suppose that the node Nf identifies the node Ng to which the ID (3, 0) is assigned, as a relay node. First, the node Nf encrypts a common key for the node Nh by using the pre-shared key L0 shared by the own node and the relay node. Then, the node Nf transmits the encrypted common key to the node Ng. Note that the ID (3, 2) of the node Nh, which is a sharing destination of the common key, is also transmitted together with the encrypted common key.

Using the pre-shared key L0, the node Ng decrypts the encrypted common key received from the node Nf. The node Ng identifies the pre-shared key K3 to be shared, based on the ID (3, 0) of the own node and the ID (3, 2) of the node Nh which is received from the node Nf. Then, the node Ng encrypts the common key using the identified pre-shared key K3.

Then, the common key which the node Ng encrypts using the pre-shared key K3 is transmitted from the node Ng to the node Nh. When receiving that encrypted common key, the node Nh decrypts the common key by using the pre-shared key K3. With the processing described above, the common key is shared between the node Nf and the node Nh.

In addition, although the node Nf, the node Ng, and the node Nh are illustrated in FIG. 2 as being arranged in a position where the node Nf, the node Ng, and the node Nh may directly communicate, the node Nf, the node Ng, and the node Nh may not be arranged in the position where the node Nf, the node Ng, and the node Nh may directly communicate. With the ad-hoc communications, since a route for reaching a final transmission destination is formed, as appropriate, by using nodes then capable of communication, the common key encrypted by the pre-shared keys is sent through multi-hop communication to the final transmission destination.

A possibility of adding a new node to a network system is described hereinafter with reference to FIG. 4. FIG. 4 is a view for illustrating the possibility of adding the new node to the network system. Processing involved in addition of the new node may be performed by the management device or processing similar thereto may be performed by the server S. In this example, the server S performs processing to add a new node.

The server S holds information on a range of values of a first element and a range of values of a second element for an ID which has already been assigned. Since a maximum value of the i is 3 in the state illustrated in FIG. 3, 0 to 3 are stored as the range of the value i of the first element. In addition, since a maximum value of the j is 2, 0 to 2 are stored as the range of the value j of the second element. The server stores a pre-shared key for every element value. For example, the server stores information indicating that the pre-shared key for which the first element i corresponds to "0" is K0.

When adding a new node, the server S assigns a new ID to the new node. The new ID includes a new value wherein a value of one element is an identical value to the same element in an ID of any existing node and a value of the other element does not coincide with the same element in an ID of any existing node. This new value is assigned to a plurality of new nodes.

For example, FIG. 4 indicates that up to four new nodes may be added to the state in FIG. 3. In an ID to be assigned to each of these four nodes, a value from 0 to 3 which have already been assigned is set for the first element i. On the one hand, a value "3" other than the values 0 to 2 which have already been assigned is commonly set for the second element j of the four nodes. Specifically, an ID (0, 3), an ID (1, 3), an ID (2, 3) and an ID (3, 3) are assigned to the added four nodes.

In addition, the server S generates a pre-shared key corresponding to the new value which is newly created in the ID. For example, the server S generates a pre-shared key L3 corresponding to the new value "3" of the second element j. Then, the server S distributes to each of the new nodes a pre-shared key corresponding to the IDs of the new nodes.

For example, the server S distributes the pre-shared keys K0 and L3 to the node to which the ID (0, 3) is assigned. The pre-shared key K0 is a pre-shared key shared among the nodes, to which the ID (0, 0), the ID (0, 1), and the ID (0, 2) are assigned respectively, of the existing nodes. In addition, the pre-shared key L3 is a pre-shared key shared with at least one node of the new nodes to which the ID (1, 3), the ID (2, 3) and the ID (3, 3) are assigned.

As described above, any element in the ID being a same value as the already operating node indicates that a pre-shared key corresponding to the afore-mentioned element and value is shared with any of the already operating nodes. In addition, a new value which is common to a plurality of new nodes is set for other nodes in the IDs of the new nodes. Specifically, a new pre-shared key corresponding to that new value and the element to which that new value is set is distributed to the new nodes.

On the one hand, the existing nodes may not have a new pre-shared key as the new nodes are added. Among new nodes, a pre-shared key being distributed only to the afore-mentioned new nodes, a possibility that the pre-shared key may leak is reduced.

Figure 5:
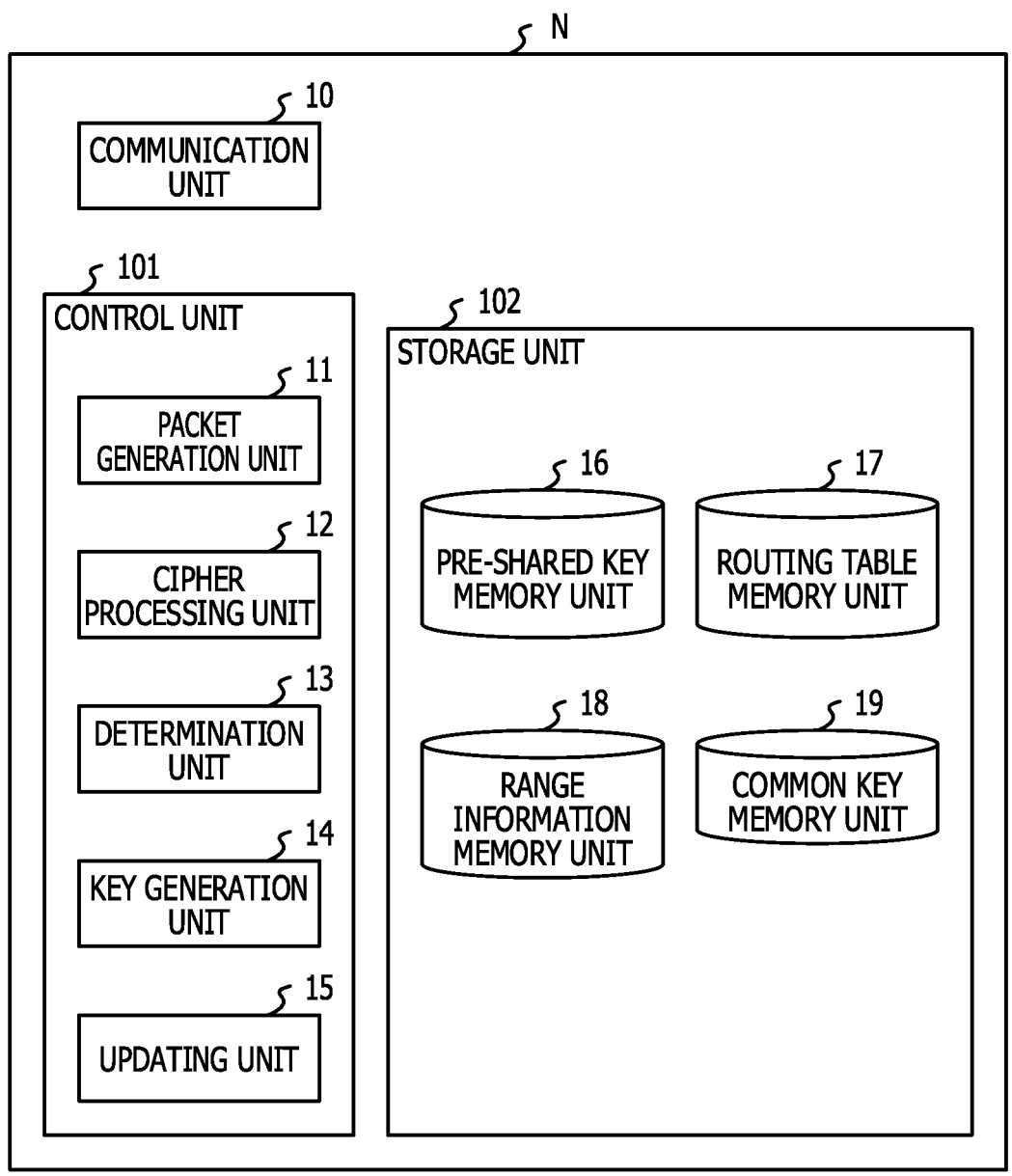
FIG. 5 is a functional block diagram of a node.

FIG. 5 is a functional block diagram of a node N. The node N has a communication unit 10, a control unit 101, and a memory unit 102.

The communication unit 10 performs communications with other nodes N or a sink node SN. For example, the communication unit 10 transmits a data packet or broadcasts a Hello packet to another node N.

The control unit 101 controls processing of the entire node. The control node 101 includes a packet generation unit 11, a cipher processing unit 12, a determination unit 13, a key generation unit 14, and an updating unit 15.

The memory unit 102 stores information requested for various processes. The memory unit 102 has a pre-shared key memory unit 16, a routing table memory unit 17, a range information memory unit 18, and a common key memory unit 19.

Then, each processing unit included in the control unit 101 is described. The packet generation unit 11 generates a Hello packet or a data packet. In this example, types of a data packet include a common key data packet to share a common key and a sensing data packet to transmit data acquired by each node.

Figure 6:
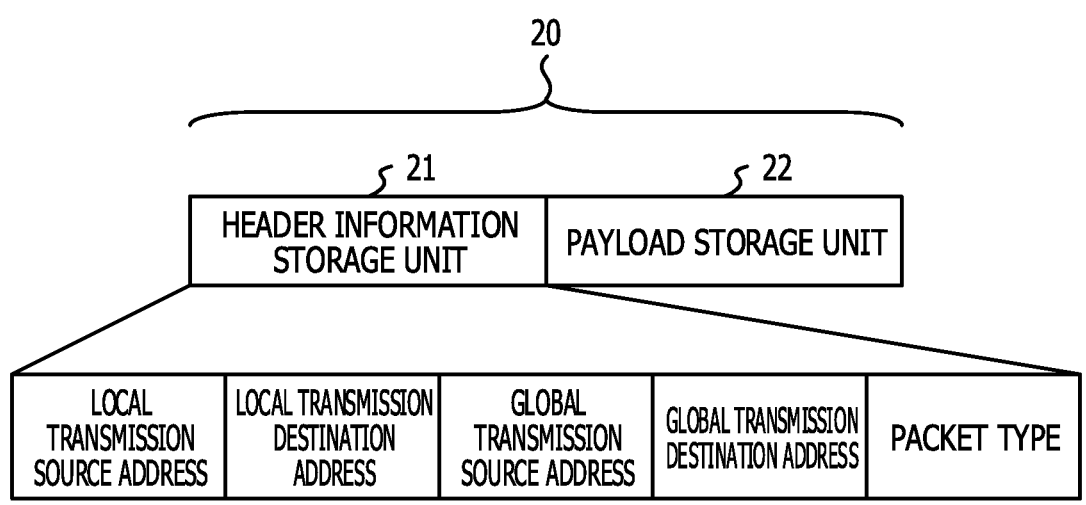
FIG. 6 is a data configuration example of a data packet.

FIG. 6 is a data configuration example of a data packet. A data packet 20 includes a header information storage unit 21 and a payload data storage unit 22. The header information storage unit 21 stores header information. The header information includes a local transmission source address, a local transmission destination address, a global transmission source address, a global transmission destination address, and a packet type. Note that the header information may further include a node ID corresponding to each address.

The local transmission source address is information on an address to which a data packet is transmitted in each communication constituting the multi-hop communication. The local transmission source address is rewritten to an address of a device which performs transmission in each communication.

The local transmission destination address is information on an address of a device which is a transmission destination of a data packet in each communication constituting the multi-hop communication. The local transmission destination address is rewritten to an address of a device which is a transmission destination in each communication.

The global transmission source address is information on an address of a device which is a start point in the multi-hop communication. For example, the global transmission source address is an address of a device which corresponds to a start point of a transfer path. The global transmission source address is not rewritten as far as a data packet is transferred within one transfer path.

The global transmission destination address is information on an address of a device which is a final transmission destination of a data packet. For example, the global transmission destination address is an address of a device which corresponds to an end point of a transfer path. The global transmission destination address is not rewritten as far as a data packet is transferred within one transfer path.

In this example, a data packet is encrypted with a key shared by the global transmission source and the global transmission destination. If the data packet is a common key data packet, that data packet is encrypted with a pre-shared key. On the one hand, if the data packet is a sensor data packet, that data packet is encrypted with a common key.

The packet type is information to discriminate a packet type. For example, a packet type "1" is set for a common key data packet of data packets. In addition, for example, a packet type "2" is set for a sensing data packet of data packets. A packet type "3" is set for a Hello packet to be described below, for example.

The payload data storage unit 22 stores payload data. The payload data includes information depending on a packet type. The payload data in a common key data packet includes sharing destination information and sharing source information, and a common key encrypted with a pre-shared key. The sharing destination information is an ID of a counterpart node which shares a common key. The sharing source information is an ID of a node which generates the common key.

When a data packet is a sensing data packet, the payload data includes data acquired from a sensor and the like.

Figure 7:
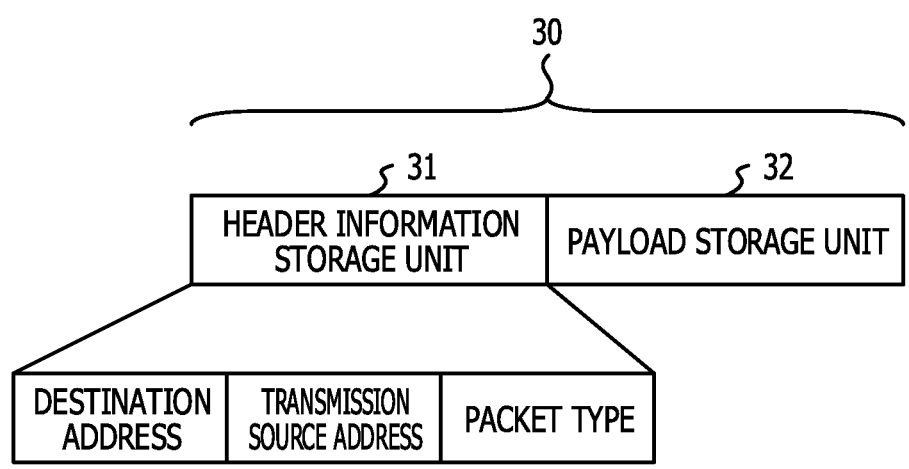
FIG. 7 is a view illustrating a data configuration example of a Hello packet.

FIG. 7 is a data configuration example of a Hello packet. A data packet 30 includes a header information storage unit 31 and a payload data storage unit 32. The header information storage unit 31 stores header information. The header information includes a destination address, a transmission source address, and a packet type.

The destination address in the Hello packet is a special address dedicated for broadcasting. For example, the destination address is an address "255.255.255.255" prepared in advance. While each node receives a packet transmitted to an individually set address, each node also receives a packet transmitted to the afore-mentioned special address. Specifically, a packet for which a special address is set is received by all nodes present in a range where the nodes may communicate with the node which transmitted the afore-mentioned packet.

The transmission source address is information on an address which transmits a Hello packet. When the Hello packet is sent through multi-hop communication, the transmission source address may have two types of a global transmission source address and a local transmission source address.

The packet type is information to discriminate a packet type. For the Hello packet, "2" is set, for example.

The payload data storage unit 32 stores payload data. The payload data in a Hello packet includes an ID of a node which generates the Hello packet. From the received Hello packet, each node N acquires an ID and an address of a node which is a transmission source of the Hello packet.

Passing a Hello packet between nodes enables identification of communication strength between the nodes. For example, when one node receives large quantities of Hello packets from another node, it means that the communication strength between these nodes is large. Each node N generates a routing table based on this communication strength. A method similar to a conventional method may be adopted for generation of a routing table.

The description goes back to FIG. 5. The cipher processing unit 12 encrypts data using a key corresponding to a data packet type. In addition, when the cipher processing unit 12 receives a data packet for which an own node is set as a global transmission destination, the cipher processing unit 12 decrypts the data using a key corresponding to a packet type.

For example, when transmitting a common key data packet, the cipher processing unit 12 encrypts the data packet using a pre-shared key corresponding to the global transmission destination. When transmitting a sensor data packet, the cipher processing unit 12 sets a common key corresponding to the global transmission destination.

In addition, when the cipher processing unit 12 receives a common key data packet for which the own node is set as a global transmission source and a sharing destination, the cipher processing unit 12 decrypts a common key by using a pre-shared key corresponding to the global transmission source. On the one hand, when the cipher processing unit 12 receives a common key data packet for which the own node is not set as a global transmission source and a sharing destination, the own node is a relay node for that common key data packet. Therefore, the cipher processing unit 12 re-encrypts the common key data packet as described below.

When a common key is shared, the determination unit 13 judges whether or not an own node and a counterpart node share a pre-shared key. As a result of this judgment, if the determination unit 13 judges that the pre-shared key is not shared, the determination unit 13 determines a relay node.

For example, the determination unit 13 compares an ID (x, y) of the own node with an ID (u, v) of the counterpart node. If a value of a first element and a value of a second element in the IDs are identical, the determination unit 13 judges that the counterpart node has a common pre-shared key Kx or Ly. Specifically, when the common key is shared, the determination unit 13 instructs the cipher processing unit 12 to use the pre-shared key Kx or Ly.

In addition, if the value of the first element and the value of the second element in the IDs are not identical, the determination unit 13 determines a relay node based on the ID of the own node and the ID of the counterpart node.

Specifically, the determination unit 13 determines that a node of an ID (x, v) which has a value x of the first element in the own node as the first element and a value v of the second element in the ID of the counterpart node as the second element is a relay node. In addition, the determination unit 13 determines that a node of an ID (u, y) which has a value y of the second element in the own node ID as the second element and a value u of the first element in the counterpart node ID as the first element is a relay node.

The key generation unit 14 newly generates a common key when an own node and a counterpart node share no common key. Then, the key generation unit 14 associates the generated common key with an ID (u, v) of the counterpart node and stores the associated common key in the common key memory unit 19.

When receiving from another device a notice that a new node is added, the updating unit 15 updates range information stored in the range information memory unit 18. The range information is information on a range which the elements in IDs may take for the respective nodes in a network system. The notice includes the range information which is changed with addition of the new node.

The pre-shared key memory unit 16 stores pre-shared key information. The pre-shared key information includes a value of each element constituting an ID of an own node and a pre-shared key corresponding to the value of each element.

Figure 8A:
FIG. 8A and FIG. 8B are views illustrating a data configuration example of pre-shared key information.
Figure 8B:
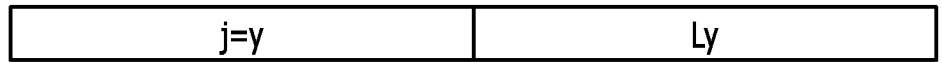

FIG. 8A and FIG. 8B are views illustrating a data configuration example of pre-shared key information. The pre-shared key memory unit 16 associates a value of each element constituting an own node ID with the pre-shared key information corresponding to the value of each element and stores the information as the pre-shared key information.

For example, when an ID of the node N is (x, y), a pre-shared key Kx is associated with the value "x" of the first element i and stored. In addition, a pre-shared key Ly is associated with the value "y" of the second element j and stored.

The routing table memory unit 17 stores routing information. The routing information is information on a transfer path. One example of the routing information is a routing table.

FIG. 9 is a data configuration example of a routing table. The routing table has items of a global transmission destination address, a global transmission destination ID, a local transmission destination address, a local transmission destination ID, and an evaluation value, and associates and stores the items.

As described above, a method similar to a conventional method may be adopted for generation of a routing table. The node N has a technique to generate a routing table and generates a routing table based on a Hello packet. The generated routing table is stored in the routing table memory unit 17. Note that the routing table is regularly updated.

An address of a node which is a global transmission destination of a data packet is depicted in the item "global transmission destination address". An ID of the node which is the global transmission destination is depicted in the item "global transmission destination ID".

An address of other node capable of directly communicating with an own node is depicted in the item "local transmission destination address". An ID of the node which is the local transmission destination is depicted in the item "local transmission destination ID". Various addresses and IDs are acquired from a Hello packet.

An evaluation value computed depending on communication status between each local transmission destination and an own node is stored in the item "evaluation value". The larger the communication strength is, the larger a value is set for the evaluation value. The technique to generate a routing table in each node computes an evaluation value related to a transmission source of a Hello packet based on the number of Hello packets received per unit time.

FIG. 9 illustrates a routing table of the node Nf. For example, when the node Nf transmits a packet to the sink node SN, an "address of Nd" for which the evaluation value corresponds to the largest value is acquired from the routing table as a local transmission destination address.

In addition, in the example of FIG. 9, when the node Nf transmits a data packet to the node Nh, the node Nh is determined as a local transmission destination. Note that this indicates a path by which a data packet reaches a desired node in one hop. However, when the node Nf transmits a data packet to the node Nh, it is requested that the node Nf and the node Nh share a common key. If the node Nf and the node Nh do not share a common key, first, the node Nf performs a process to share a common key.

Then, the range information memory unit 18 in FIG. 5 stores range information. The range information is information on a range of values which each element in the ID related to each node in the network system may take. If a plurality of nodes is virtually arranged in a matrix of m rows by n columns and an ID is assigned to each node, a value of a first element in the ID is an integer from 0 to m−1. In addition, a value of a second element in the ID is an integer from 0 to n−1.

FIG. 10A and FIG. 10B illustrate data configuration examples of range information. The range information stores information on a range of values the afore-mentioned element may take for each element in the ID. FIG. 10A illustrates the range information on a first element in the ID, and FIG. 10B illustrates the range information on a second element in the ID. In the example of FIG. 10A, the ID of the node in a network system indicates that the first element of the ID has a minimum value of "0" and a maximum value of "m−1". Specifically, it is indicated that the ID of the node in the network system takes an integer from 0 to m−1 as a value of the first element of the ID.

In addition, the example of FIG. 10B indicates that the ID of the node in the network system has a minimum value of "0" and a maximum value of "n−1". Specifically, it is indicated that the ID of the node in the network system takes an integer from 0 to n−1 as a value of the second element of the ID. Note that only a maximum value of the range which each element may take may be stored as the range information.

Here, suppose that when a new node is added, all nodes are virtually arranged in a matrix of m' rows by n' columns. When receiving from the server S a notice including the range information indicating that a value of the first element is 0 to m'−1 and the range information indicating that a value of the second element is 0 to n'−1, the updating unit 15 updates the maximum value of each element of the range information stored in the range information memory unit 18 by using the maximum value of the range information included in the notice.

For example, the updating unit 15 updates the maximum value "m−1" to "m'−1" for the first element. The updating unit 1 also updates the maximum value "n−1" to "n'−1" for the second element.

The common key memory unit 19 stores common key information. The common key information includes a sharing destination which shares a common key and the common key. One example of the common key information is a common key table.

FIG. 11 illustrates a data configuration example of a common key table. A common key table associates a sharing destination ID with a common key and stores the sharing destination ID and the common key. FIG. 11 illustrates a common key table which a node Nf to which ID (0, 0) is assigned has. FIG. 11 illustrates that the node Nf already shares a common key M1 with a node ID (3, 0). For example, when a data packet is passed to/from a node Ng to which a node ID (3, 0) is assigned, the common key M1 is used. Note that as the common key M1 or M2, a value "0×256451" or a value "0×645125" is stored in the common key table.

In addition, when the node Nf shares a new common key M3 with a node Nh, an ID (3, 2) assigned to the node Nh and the common key M3 are associated and newly stored in the common key table.

Figure 12:
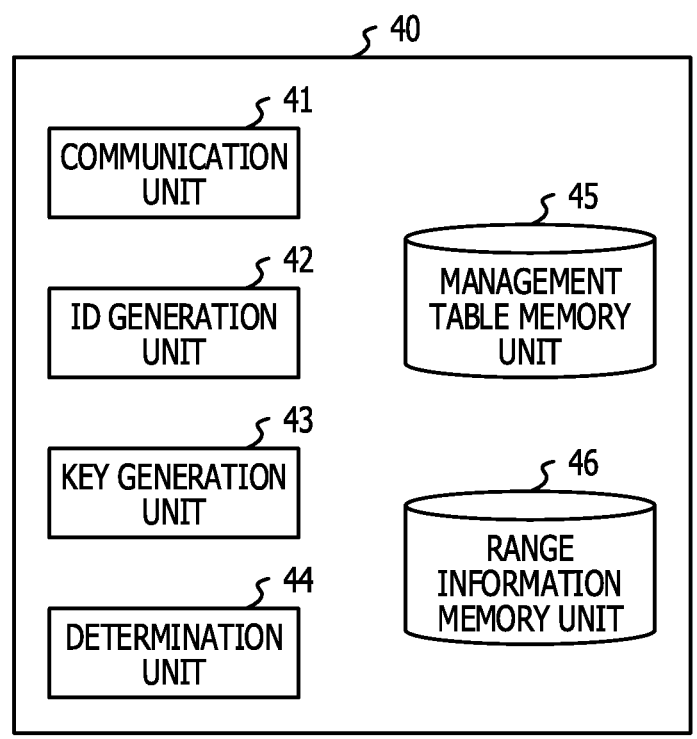
FIG. 12 is a functional block diagram of a management device 40.

A functional block of the management device is described hereinafter. FIG. 12 is a functional block diagram of a management device 40. In this example, the management device assigns an ID or a pre-shared key to each node before or while a network system operates. The management device 40 may not be included in the network system or may be a computer independent of the network system.

Note that a server S may have functions of the management device 40. Specifically, the server S may assign IDs and pre-shared keys to all nodes. In this case, the server S to be described below further includes the processing unit as illustrated in FIG. 12, in addition to a processing unit illustrated in FIG. 14.

The management device 40 has a communication unit 41, an ID generation unit 42, a key generation unit 43, a determination unit 44, a management table memory unit 45, and a range information memory unit 46.

The communication unit 41 communicates with other devices. For example, the communication unit 41 transmits an ID and a pre-shared key corresponding to the ID. Note that an ID and a pre-shared key may be assigned offline without going through a communication network.

The ID generation unit 42 generates a unique ID (i, j) for each node N. First, the ID generation unit 42 stores in the range information memory unit 46 range information indicating a range of values of a first element in an ID and range information indicating a range of values of a second element. Then, the ID generation unit 42 generates an ID having a value in the range of values of the first element and a value in the range of values of the second element which are stored in the range information memory unit 46. Furthermore, the ID generation unit 42 instructs the communication unit 41 to transmit the generated ID to each node. In addition, the ID generation unit 42 instructs the communication unit 41 to transmit to each node the range information at the time when the ID is assigned.

In this example, depending on the number of nodes which are caused to subscribe to a same network at certain time, a range of values of each element in an ID is first determined. For example, as illustrated in FIG. 3, when the network system including 12 nodes is operated, a manager enters information indicating four rows by three columns.

Then, based on the information entered by the manager, the ID generation unit 42 generates range information having a minimum value of "0" and a maximum value of "3" for the first element. In addition, the ID generation unit 42 generates range information having a minimum value of "0" and a maximum value of "2" for the second element. Then, the ID generation unit 42 assigns an ID to each node based on the generated range information and stores the range information in the range information memory unit 46.

In addition, when a new node is added, the manager also enters to increase the range of each element, depending on the number of nodes to be newly added. Depending on the entry, the range information in the range information memory unit 46 is updated. As an ID for the new node, the ID generation unit 42 generates an ID in which any element of elements indicating IDs is a value within the range information prior to updating and another element is a new value in a range which is increased by updating.

The key generation unit 43 generates a pre-shared key. For example, the key generation unit 43 generates a unique pre-shared key Ki or Lj for every value of each element in an ID. Then, the key generation unit 43 stores values of the respective elements and pre-shared keys corresponding to the values in the management table memory unit 45. For example, if a range of values of a first element in an ID is 0 to m−1, the key generation unit 45 generates a pre-shared key to each of the first element values, associates each value with each pre-shared key, and stores each value associated with each pre-shared key in the management table memory unit 45. In addition, if the range information is updated as a new node is added, the key generation unit 43 generates a pre-shared key for a value to be newly included in the range information.

The determination unit 44 determines a pre-shared key to be distributed to each node based on an ID. The determination unit 44 acquires a pre-shared key corresponding to a value of each element in the ID from the management table memory unit 45 and instructs the communication unit 41 to transmit the acquired pre-shared key to the node N.

The management table memory unit 45 stores a management table to manage a pre-shared key. FIG. 13 illustrates a data configuration example of a management table. The management table associates a value of each element in an ID with a pre-shared key which is unique for each element value and stores the value of each element and the pre-shared key. For example, as a pre-share key K0 or K1, a value "0×763542" or a value "0×243545" is stored, for example.

Note that the management table illustrated in FIG. 13 is a management table of a pre-shared key for the first element. A management table for the second element structured similarly to the management table illustrated in FIG. 13 is also stored in the management table memory unit 45.

The determination unit 44 refers to the management table memory unit 45 and determines to distribute a pre-shared key K0 associated with a value "0" to a node to which an ID having the first element value of "0" is assigned.

The range information memory unit 46 stores range information on a range of values of an assigned ID. This range information has a data configuration similar to the range information memory unit 18 in the node N.

Figure 14:
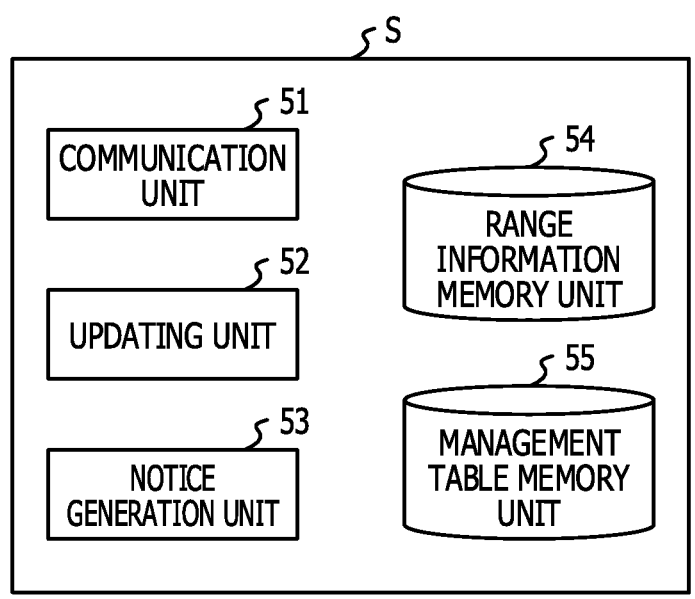
FIG. 14 is a functional block diagram of a server S.

A functional block of the server S is described hereinafter. FIG. 14 is a functional block diagram of the server S. The server S is a computer configured to notify each node N of addition of a new node to a network system while the network system is operating. As described earlier, in this example, a description is given on the assumption that the management server 40 assigns IDs and pre-shared keys to all nodes. The server S, not the management device 40, may assign IDs and pre-shared keys to at least some of the nodes.

The server S has a communication unit 51, an updating unit 52, a notice generation unit 53, a range information memory unit 54, and a management table memory unit 55. The communication unit 51 communicates with the sink node SN or the management device 40.

For example, the communication unit 51 receives range information from the management device 40. When the range information is updated as a new node is added, the communication unit 51 receives new range information or information on a new pre-shared key. Note that range information may also be entered by the manager, rather than being received from the management device 40. For example, the manager may enter the range information when installation of a new node at each point completes.

In addition, as the range information is updated, the communication unit 51 transmits a notice on addition of the new node to each node N by way of the sink node SN.

The updating unit 52 updates information stored in various memory units. For example, when receiving new range information from the management device 40, the updating unit 52 rewrites range information stored in the memory units with the new range information. In addition, the updating unit 52 adds to the management table memory unit 55 a new pre-shared key which is added accompanying the new range information.

The notice generation unit 53 generates an additional notice on a new node. For example, a notice includes updated range information. Note that the notice is broadcasted from the sink node SN to each node N.

The range information memory unit 54 stores range information. Note that the range information has a similar data configuration to range information to be stored in the range information memory unit 18 in the node N. For example, the range information memory unit 54 stores range information acquired from the management device 40. In addition, range information to be stored in the range information memory unit 54 may be such configured to accept range information from the manager.

The management table memory unit 55 stores a management table for managing a pre-shared key. This management table has a similar data configuration to the management table memory unit 45 in the management device 40.

The server S and the management device 40 may be coupled by way of a network or may be independent without being coupled by way of a network. In addition, the server S also has a function as a server S in a conventional ad-hoc network system.

Figure 15:
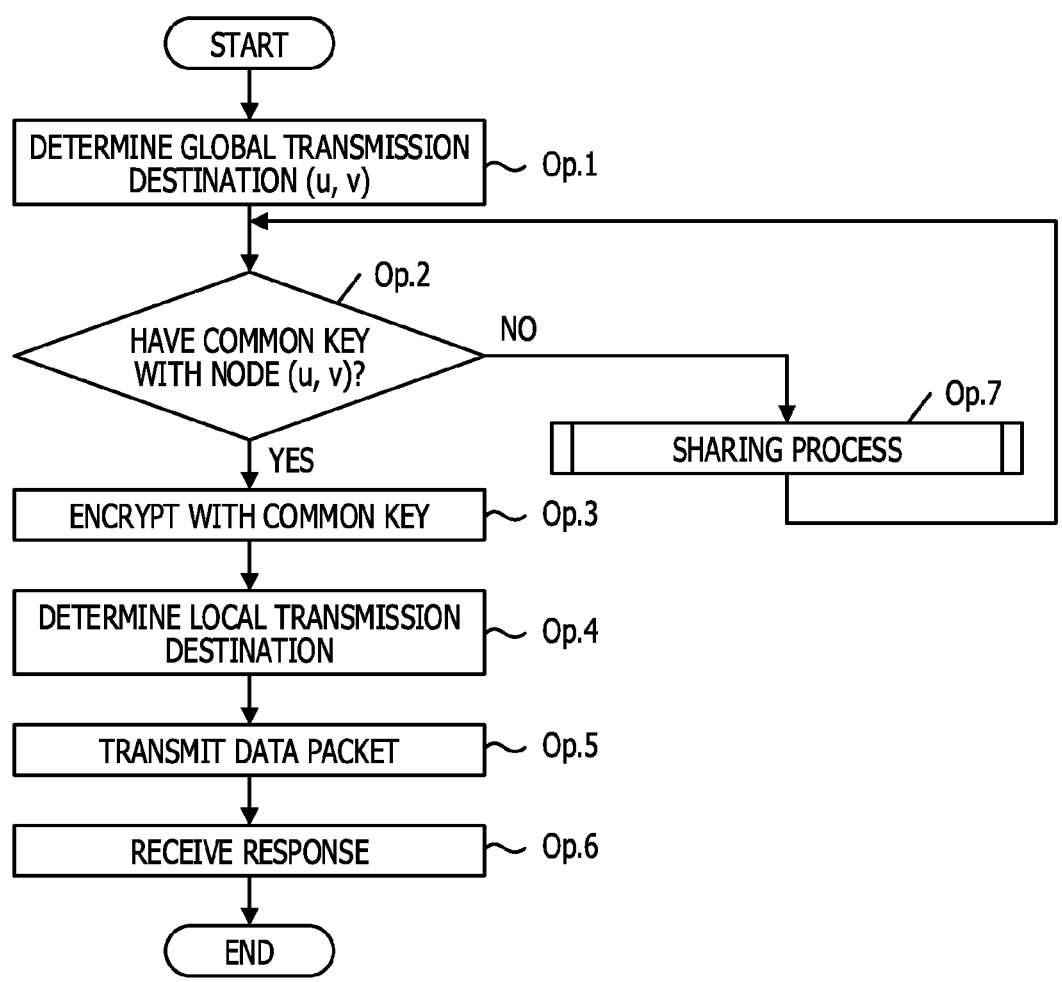
FIG. 15 is a flow chart when a node N transmits a data packet.

Processing when the node N transmits a data packet is described hereinafter. FIG. 15 is a flow chart when the node N transmits a data packet. The node N performs processing in FIG. 15 and FIG. 16 when the node N is a global transmission source of the data packet. In this description, an ID of the node N is represented as (x, y). In addition, prior to the processing in FIG. 15, a control unit 101 of the node N acquires sensor data from a sensor. Then, the node N starts the processing illustrated in FIG. 15 at predetermined timing and performs a process to transmit the acquired sensor data in a sensor data packet.

Under the control of a processor of the node N, the packet generation unit 11 determines a global transmission destination (u, v) of a data packet (Op. 1). For example, a global transmission destination is determined depending on content of sensor data. A type of this data packet is a sensor data packet.

"u" is a first element in an ID and a value included in range information of the first element. Specifically, when the range information on the first element is 0 to m−1, "u" is a value from 0 to m−1. "v" is a second element in an ID and a value included in range information of the second element. Specifically, when the range information on the second element is 0 to n−1, "v" is a value from 0 to n−1.

In Op. 1, the packet generation unit 11 further acquires an address corresponding to the global transmission destination (u, v) from a routing table and stores the acquired address in the header information storage unit 21. In addition, the packet generation unit 11 sets an address of an own node (x, y) for the global transmission destination address in the data packet. Furthermore, the packet generation unit 11 sets "2" indicative of a sensor data packet for a packet type in the data packet.

Then, the cipher processing unit 12 refers to the common key memory unit 19 and judges whether the common key memory unit 19 has a common key to a destination device (node) specified for the global transmission destination (u, v) (Op. 2). When the common key corresponding to the global transmission destination (u, v) is stored in the common key memory unit 19 (Op. 2; YES), the cipher processing unit 12 encrypts sensor data using the common key Op. 3). Furthermore, the cipher processing unit 12 stores payload data including the encrypted sensor data in the payload data storage unit 22 for the data packet. Note that the cipher processing unit 12 may use the common key to encrypt any data other than sensor data.

Then, the packet generation unit 11 refers to the routing table to determine a local transmission destination (Op. 4). The packet generation unit 11 refers to the routing table with the global transmission destination address as a key. Then, the packet generation unit 11 acquires a local transmission destination address to which the largest evaluation value is set, of local transmission destination addresses associated with the global transmission destination address in the routing table.

Then, the packet generation unit 11 sets the acquired local transmission destination address in the header information storage unit 21 for the data packet. The packet generation unit 11 also sets an address of the own node for a local transmission destination address in the data packet.

Then, the communication unit 10 transmits the sensor packet generated as described above (Op. 5). Then, when that sensor data packet is received by a local transmission destination, the communication unit 10 receives a response from a node which is set for the local transmission destination in that sensor data packet (Op. 6). Note that a destination device set for the global transmission destination may also transmit a response.

With the processing described above, the sensor data packet is transmitted from the global transmission source to the global transmission destination. Since the sensor data packet is encrypted with a common key corresponding to the global transmission destination, leakage of information in a transfer path is avoided.

On the one hand, when the node N (x, y) does not have a common key with the node (u, v) (Op. 2; NO), the node N performs a sharing process (Op. 7). Then, when the sharing process ends, the node N returns to Op. 2 to continuously perform a process to transmit the sensor data packet.

Figure 16:
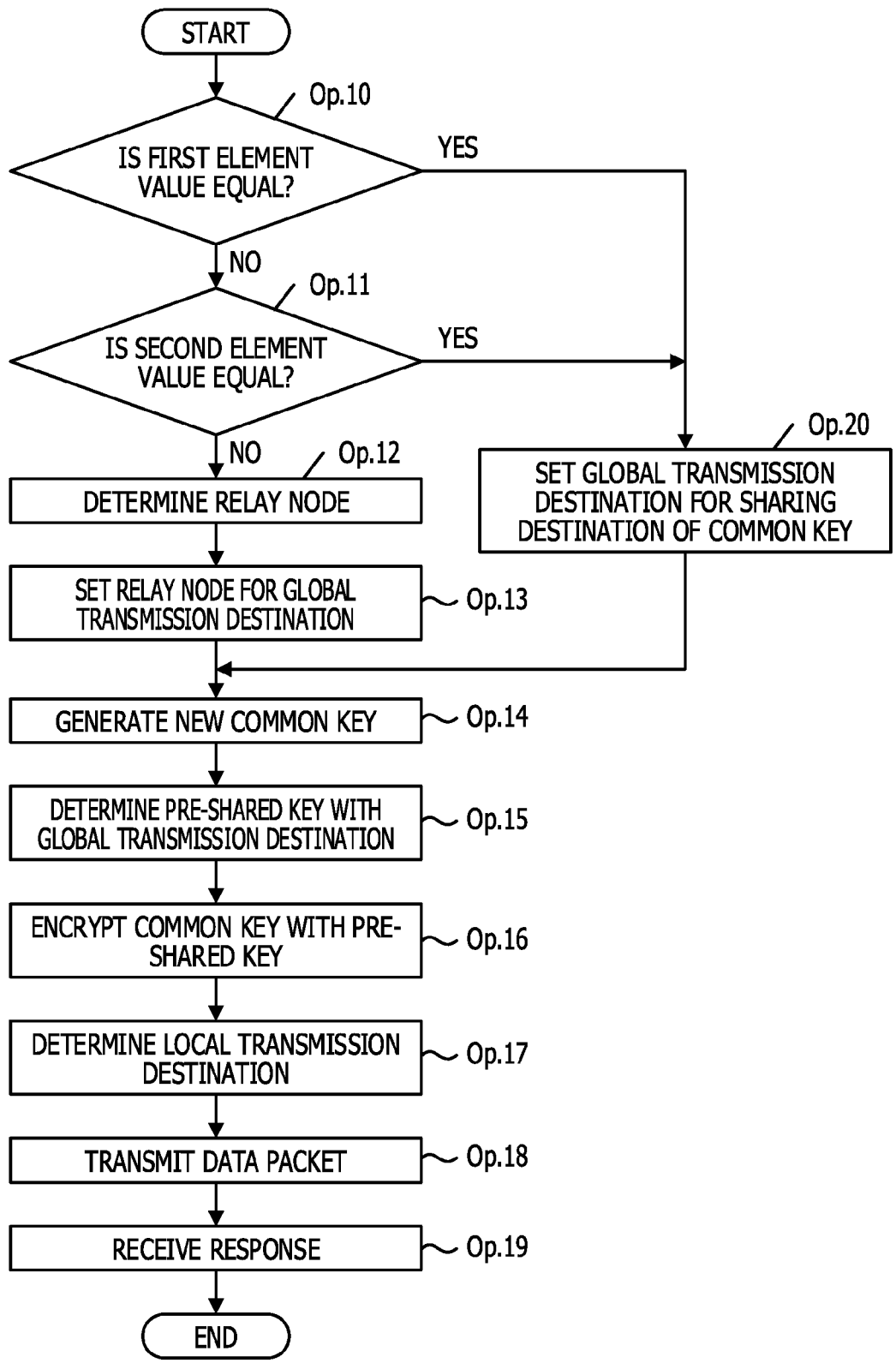
FIG. 16 is a flow chart for a sharing process.

A sharing process when the node N (x, y) sets the global transmission destination (u, v) as a sharing destination of the common key is described. FIG. 16 is a flow chart of the sharing process.

First, the determination unit 13 compares an ID of the own node with an ID of a sharing destination and judges whether or not values of first elements in the IDs are equal (Op. 10). If the first element values are equal (u=x) in the own node and the sharing destination (Op. 10; YES), the determination unit 13 determines that the global transmission destination of the common key data packet is the sharing destination (u, v).

Then, in response to the determination, the packet generation unit 11 sets the global transmission destination of the common key data packet for the sharing destination (u, v) (Op. 20). The packet generation unit 11 sets an address of the global transmission destination (u, v) for the global transmission destination address of the common key data packet. In addition, the packet generation unit 11 sets an address of the own node for the global transmission source address of the common key data packet. Furthermore, the packet generation unit 11 sets "1" indicative of the common key data packet for a packet type of the common key data packet.

On the one hand, if the first element values are not equal (u=x) in the own node and the sharing destination (Op. 10; NO), the determination unit 13 compares the ID of the own node with the ID of the sharing destination to determine whether or not values of second elements in the IDs are equal (Op. 11). If the second element values are equal (v=y) in the own node and the sharing destination (Op. 11; YES), the determination unit 13 determines that the global transmission destination of the common key data packet is the sharing destination (u, v) (Op. 20).

Now, the first element value in the ID of the own node being equal to the first element value in the ID of the sharing destination or the second element value in the ID of the own node being equal to the second element value in the ID of the sharing destination indicates that a pre-shared key is shared by the own node and the sharing destination. Therefore, the own node and the sharing destination may share the common key using the shared pre-shared key.

On the one hand, if the second element values are not equal (v#y) in the own node and the sharing destination (Op. 11; NO), the determination unit 13 determines a relay node based on the ID (x, y) of the own node and the ID (u, v) of the sharing destination (Op. 12). For example, the determination unit 13 determines that a node (x, y) which has the first element value of the ID (x, y) of the own node and the second element value of the ID (u, v) of the second element is the relay node. The determination unit 13 also determines that a node (u, y) which has the second element value of the ID (x, y) of the own node and the first element value of the ID (u, v) of the sharing destination is the relay node.

Then, the packet generation unit 11 sets the relay node for the global transmission destination of the common key data packet (Op. 13). The packet generation unit 11 acquires an address corresponding to the determined relay node from a routing table and stores the acquired address for the global transmission destination in the header information storage unit 21 for the common key data packet. Furthermore, the packet generation unit 11 sets the address of the own node for the global transmission source address of the common key data packet and sets "1" indicative of the common key data packet for the packet type.

Then, the key generation unit 14 generates a common key to be used in encrypted communications between the own node (x, y) and the sharing destination (u, v) (Op. 14). For example, the common key is generated through the use of a random number generator.

Then, the determination unit 13 determines a pre-shared key based on the ID of the global transmission destination and the ID of the own node (Op. 15). For example, when the global transmission source is the sharing destination (u, v) and when "u" and "x", which are the first elements in the IDs of the sharing destination and the own node (x, y), respectively, are equal, the determination unit 13 determines "Kx" as this pre-shared key. When "v" and "y", which are the second elements in the IDs of the sharing destination and the own node (x, y) are equal, the determination unit 13 also determines "Ly" as this pre-shared key.

Similarly, when the global transmission destination is the relay node (x, v), the determination unit 13 determines "Kx" as this pre-shared key. When the global transmission destination is the relay node (u, y), the determination unit 13 also determines "Ly" as this pre-shared key.

Then, the cipher processing unit 12 uses the pre-shared keys determined by the determination unit 13 to encrypt the common key (Op. 16). Furthermore, the cipher processing unit 12 stores the encrypted common key in the payload data storage unit 22 for the common key data packet. The packet generation unit 11 also stores the ID (u, v) of the sharing destination as the sharing destination of the common key in the payload storage unit 22, the packet generation unit 11 stores the ID (x, y) of the own node as the sharing source.

Then, the packet generation unit 11 refers to the routing table and determines the local transmission destination based on the global transmission destination (Op. 17). In Op. 17, the packet generation unit 11 acquires an address corresponding to the local transmission destination from the routing table and stores the acquired address in the local transmission destination in the header information storage unit 21 for the common key data packet. The packet generation unit 11 also sets the address of the own node for the local transmission source address of the common key data packet.

Then, the communication unit 10 transmits the common key data packet to the local transmission destination address (Op. 18). Then, when that common key data packet is received by the local transmission destination, the communication unit 10 receives a response from a node which is set for the local transmission destination in that common key data packet (Op. 19).

As described above, when an own node and a sharing destination share a pre-shared key, a global transmission destination and a sharing destination are a same node. Then, a common key is shared by the own node and the sharing destination by using a common pre-shared key.

When the own node and the sharing destination do not share the pre-shared key, a common key data packet for which a relay node is set for the global transmission destination is transmitted. Then, the common key data packet is transmitted to the sharing destination by way of the relay node. As such, sharing of the common key is implemented by way of the relay node. Furthermore, a relay node which shares at least one pre-shared key with the own node and which shares at least one pre-shared key with the sharing destination of the common key may be specified for a relay node. Congestion of a network is reduced by specifying a relay node so that the number of nodes relaying a common key data packet between an own node and a sharing destination is small (for example, one, which is the least number).

Figure 17:
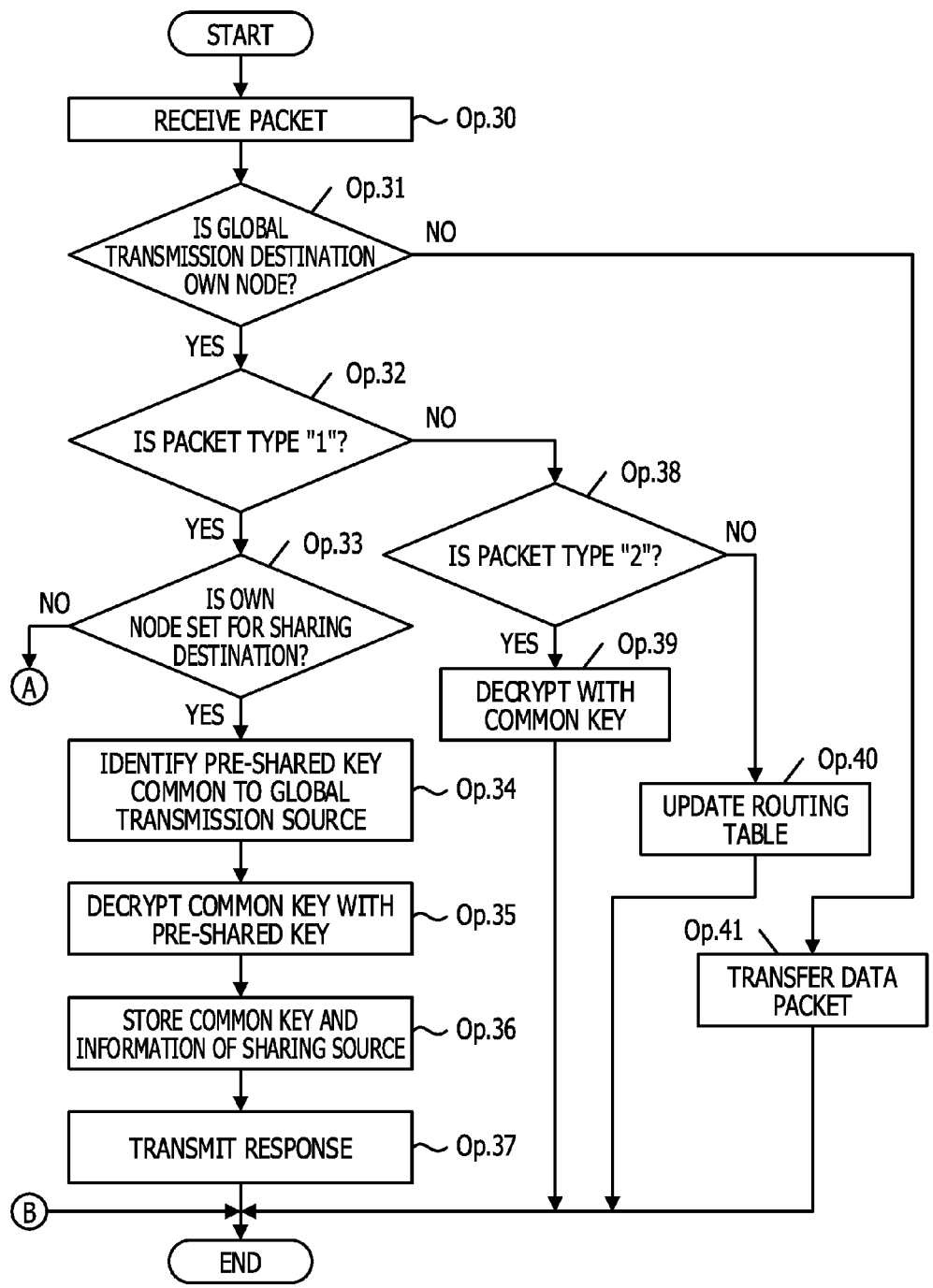
FIG. 17 and FIG. 18 are flow charts when a packet is received.
Figure 18:
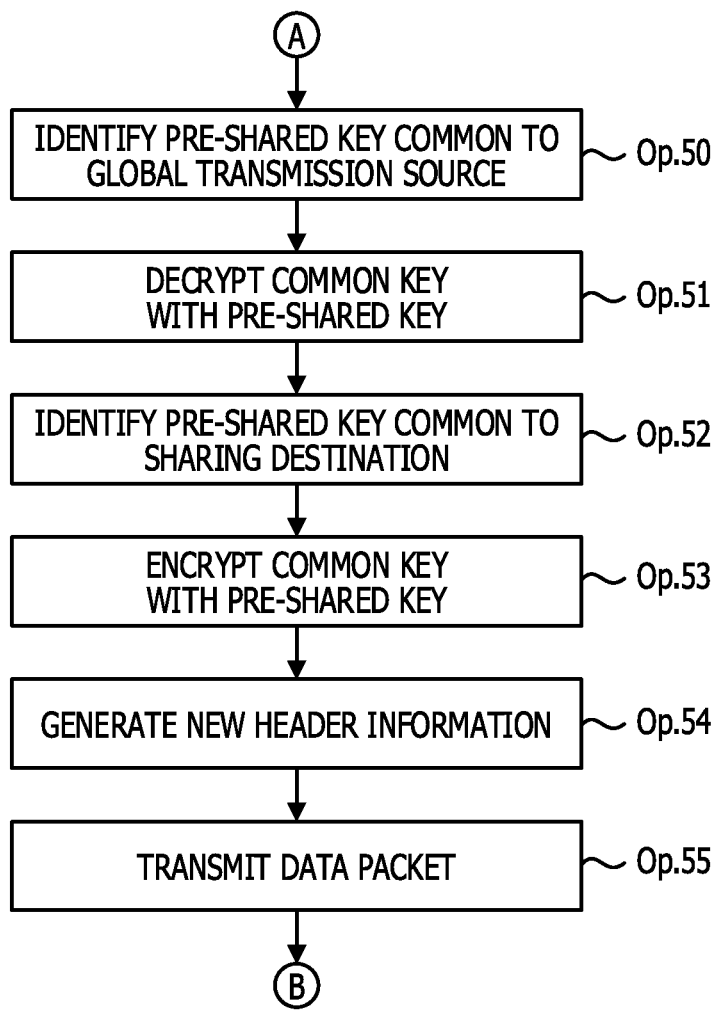

Processing when the node N receives a packet is described hereinafter. FIG. 17 and FIG. 18 are flow charts when a packet is received. When the node N is on the packet receiving side, the processing in FIG. 17 and FIG. 18 is performed.

The communication unit 10 receives a packet (Op. 30). The control unit 101 judges whether or not the packet received by the communication unit 10 is an own node (Op. 31). When an address of the own node or an address for broadcasting is set for a global transmission destination in the received packet, the control unit 101 judges that the received packet is a packet addressed to the own node. Note that when a Hello packet is received in Op 30, the control unit 101 does not fail to judge YES in the processing of Op. 31.

When the control unit 101 judges that a global transmission destination of the received packet is not the own node (Op. 31; NO), the communication unit 10 transfers the received packet (Op. 41). Prior to this packet transfer, the packet generation unit 11 rewrites a local transmission destination address and a local transmission source address in the received packet, according to a routing table of the own node and depending on the global transmission destination. The packet generation unit 11 rewrites the local transmission destination address in the packet to an address of a counterpart node with which the own node may communicate, and the local transmission source address to the address of the own node. The communication unit 10 transfers the packet thus rewritten by the packet generation unit 11. Then, this processing ends.

On the one hand, when the control unit 101 judges that the global transmission destination of the received packet is the own node (Op. 31; YES), the control unit 101 judges whether or not a packet type of the received packet is "1" (Op. 32). If the packet type is not "1" (Op. 32; NO), the packet generation unit 11 judges whether or not a packet type is "2" (Op. 38).

If the packet type is not "2" (Op. 38; NO), the control unit 101 updates the routing table (Op. 40). In this example, a packet whose global transmission destination is the own node and whose packet type is not "2" is a Hello packet. Note that a conventional technique may be adopted for generation and updating of a routing table. Then, this processing ends.

On the one hand, if the packet type is "2" (Op. 38; YES), the cipher processing unit 12 decrypts the received data packet with a common key (Op. 39). The packet type being "2" signifies that the received packet is a sensor data packet. Thus, the cipher processing unit 12 acquires from the common key memory unit 19 he common key shared by the own node and the global transmission source of the received packet. Then, the cipher processing unit 12 decrypts sensor data in the received data packet using the acquired common key. Then, this processing ends.

On the one hand, in Op. 32, if the packet type is "1" (Op. 32; YES), the received packet is a common key data packet. Thus, the determination unit 13 refers to the payload data storage unit 22 of the common key data packet to judge whether or not the own node is set as a sharing destination (Op. 33).

If the sharing destination is the own node (Op. 33; YES), the determination unit 13 identifies a pre-shared key which is common to the own node and the global transmission source of the received packet (Op. 34). First, the determination unit 13 refers to header information (header storage unit 21) of the received packet to acquire an ID corresponding to the global transmission source address. Note that if the header information does not include the ID, the determination unit 13 refers to a routing table of the own node to search for the ID corresponding to the global transmission source address.

Then, the determination unit 13 identifies an element which has a same value as the own node of first and second elements in the acquired ID and a pre-shared key corresponding to the value.

Then, the cipher processing unit 12 acquires the identified pre-shared key from the pre-shared key memory unit 16 and uses the acquired pre-shared key to decrypt the common key included in payload data of the received packet (Op. 35). The control unit 101 associates the common key acquired through decryption with an ID of a sharing source and stores in the common key memory unit 19. Then, the control unit 101 transmits a response that the common key data packet is received, to the global transmission destination in the common key data packet, by way of the communication unit 10 (Op. 37).

With the processing described above, a node which is a sharing destination obtains a common key from a sharing source. Therefore, encrypted communications using the common key are performed when a sensor data packet is passed between a node of the sharing source and a node of the sharing destination.

On the one hand, if the sharing destination is not the own node (Op. 33; NO), this processing proceeds to Op. 50. This indicates that the own node is a relay node for the received packet.

The determination unit 13 identifies a common pre-shred key, depending on an ID of a global transmission source of a received packet and an ID of the own node (Op. 50). First, the determination unit 13 identifies an element which has a same value as the ID of the own node of first and second elements in the ID of the global transmission source and a pre-shared key corresponding to the value.

Then, the cipher processing unit 12 acquires the identified pre-shared key from the pre-shared key memory unit 16 and uses the acquired pre-shared key to decrypt a common key included in payload data of the received packet (Op. 51). Then, the determination unit 13 refers to the payload data storage unit 22 of the received packet (common key data packet) and identifies a pre-shared key which is common to the sharing destination and the own node based on the ID of the node specified as the sharing destination and the ID of the own node (Op. 52).

The cipher processing unit 12 uses the identified pre-shared key to encrypt the common key which is decrypted in Op. 51 (Op. 53). Then, the packet generation unit 11 generates new header information (Op. 54). In the new header information, the address of the sharing destination is set for a global transmission destination address and the address of the own node for a global transmission source address. Furthermore, the packet generation unit 11 sets for the local transmission destination address in the header information a local transmission destination address which corresponds to the global transmission destination address acquired by referring to a routing table of the own node, and sets the address of the own node for the local transmission source address.

Then, the determination unit 13 transits the common key data packet newly created in this manner, by way of the communication unit 10 (Op. 55). Then, the sharing process ends. Note that similar to Op. 37, the communication unit 10 may transmit a response to the global transmission destination in the received packet.

With the above processing, if an own node is a relay node for a received packet, re-encryption is performed depending on a sharing destination and a new common key data packet is transmitted to the sharing destination. Thus, when receiving that new common key data packet, the sharing destination may acquire a common key to be used with a sharing source, by using a pre-shared key with the relay node.

Figure 19:
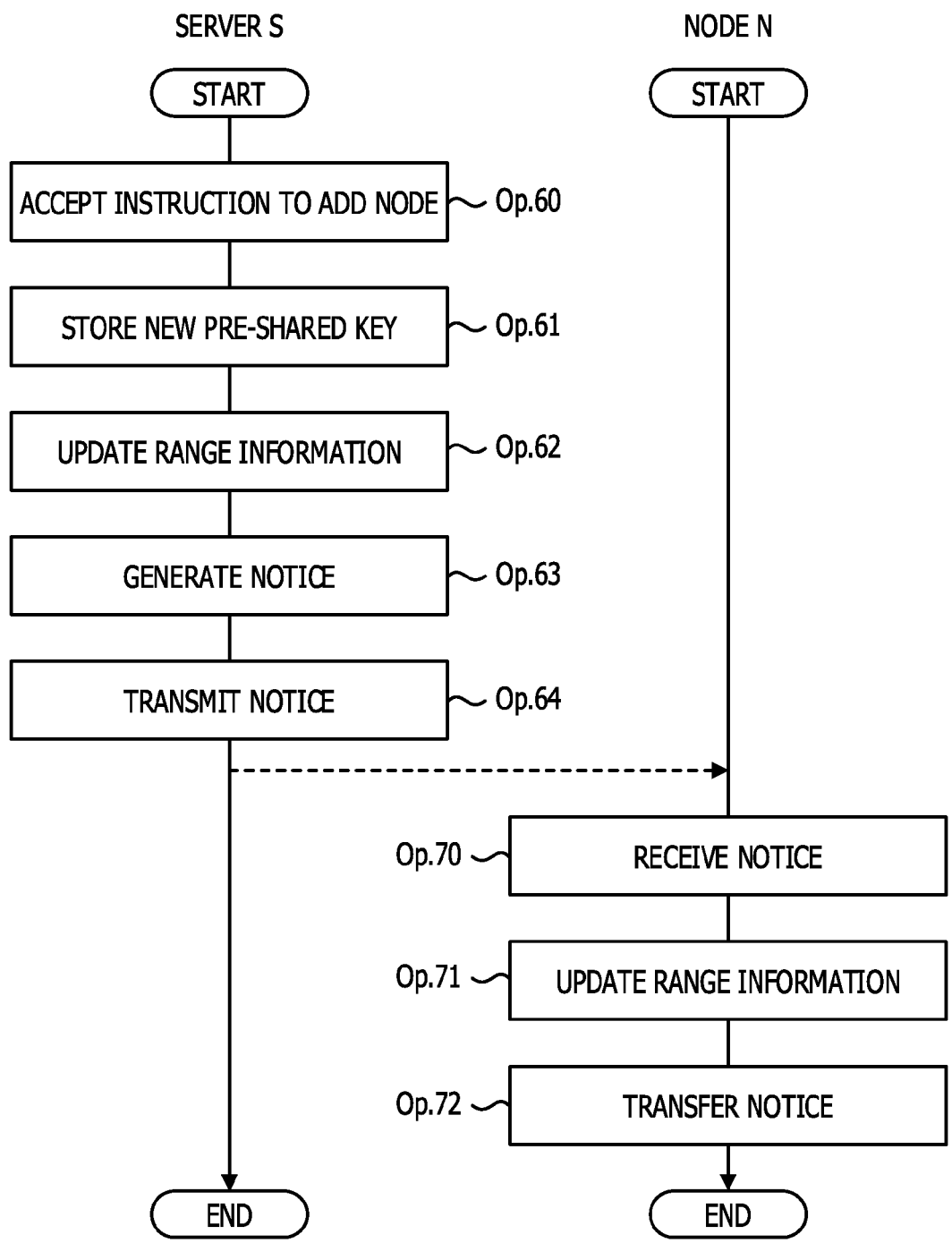
FIG. 19 is a flow chart of a process to add in the server S and a process to add in the node N.

Then, a process to add with a server S and a node N when a new node is added is described hereinafter. FIG. 19 is a flow chart of the process to add in the server S and the process to add in the node N.

The communication unit 51 of the server S accepts an instruction to add of the node N from the communication unit 41 of the management device 40 (Op. 60). Note that the server S may accept the instruction to add though entry by the manager. The instruction to add includes information on a range of new values which a first element in the node ID may take and a range of new values which a second element in the node ID may take. The instruction to add further includes information on values to be newly included in the range information and a pre-shared key newly created corresponding to the values.

However, when the server S generates a new ID and a pre-shared key, the instruction to add does not include the information on the values to be newly included in the range information and the pre-shared key newly created corresponding to the values. Then, after accepting the instruction to add, the server S generates a new ID and a pre-shared key.

The server S stores in the management table memory unit 55 the values to be newly included in the range information and the pre-shared key newly created corresponding to the values (Op. 61).

Then, based on the instruction to add, the updating unit 52 of the server S updates the range information stored in the range information memory unit 54 (Op. 62). For example, when the range information of the first element stored in the range information memory unit 54 is 0 to m−1, the updating unit 52 updates the range information of the first element to 0 to m'−1 based on the instruction to add. In addition, when the range information of the second element stored in the range information memory unit 54 is 0 to n−1, the updating unit 52 updates the range information of the second element to 0 to n'−1 based on the instruction to add.

Then, the notice generation unit 53 generates a notice based on the updated range information (Op. 63). Note that the notice includes the updated range information. Then, the communication unit 51 transmits the generated notice (Op. 64). In addition, the notice is protocol converted at the sink node SN and converted to a packet for broadcasting. Then, this notice after conversion is broadcasted from the sink node SN.

On the one hand, the communication unit 10 of the node N receives the notice from the server S by way of the sink node SN (Op. 70). Note that a notice may be received by the node N through multi-hop communications. Then, the updating unit 51 of the node N updates the range information stored in the range information memory unit 18 (Op. 71).

For example, when range information of the first element stored in the range information memory unit 18 is 0 to m−1, the updating unit 15 updates the range information of the first element to 0 to m'−1 based on the instruction to add. In addition, for example, when range information of the second element stored in the range information memory unit 18 is 0 to n−1, the updating unit 15 updates the range information of the second element to 0 to n'−1 based on the instruction to add. Furthermore, the communication unit 10 transmits the notice to other nodes (Op. 72). The notice may be broadcasted.

With the above processing, in a serve S which manages a network system, range information of elements in an ID is updated as a new node is added. Furthermore, a notice including the range information being transmitted to nodes in the network system, the new node is added without information on a pre-shared key and the like being transmitted.

In addition, the range information being updated based on the notice, the node N detects addition of the new node. Then, the information on the pre-shared key is not updated, accompanying addition of the new node. Therefore, according to this example, a node is easily added to the network system.

Figure 20:
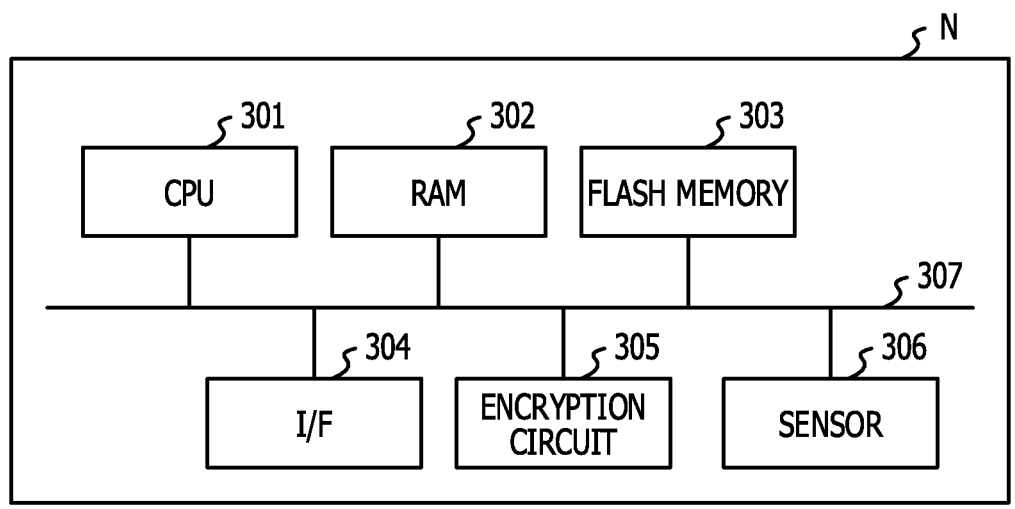
FIG. 20 is a view illustrating a hardware configuration example of the node N.

FIG. 20 is a hardware configuration example of a node N. The node N includes a central processing unit (CPU) 301, a random access memory (RAM) 302, a flash memory 303, an interface (I/F) 304, an encryption circuit 305, a sensor 306, and a bus 307. The CPU 301, the RAM 302, the flash memory 303, the I/F 304, the encryption circuit 305 and the sensor 306 are coupled by the bus 307.

The CPU 301 takes control of the entire node N. The CPU 301 functions as a control unit 101 by executing a program loaded in the RAM 302.

The RAM 302 is used as a work area for the CPU 301. The flash memory 303 stores a program, information on various keys, and a routing table. Note that the flash memory 303 is one example of a memory unit 102. The program includes a program to perform each process in the nodes depicted in the flow charts of FIG. 15 to FIG. 19. For example, a control program for causing the node N to perform a process to transmit a data packet, a sharing process, a process to receive a packet, a process to add is stored in the flash memory 303.

The CPU 301 loading a program stored in the flash memory 303 to the RAM 302 and executing the program, the node N functions as various types of processing units depicted in FIG. 5. The node N also performs the processing in FIG. 15 to FIG. 19.

The I/F 04 transmits a packet with the multi-hop communications. The I/F 304 is one example of the communication unit 10.

The encryption circuit 305 is a circuit to encrypt data with a cipher key when data is encrypted. For example, the encryption circuit 305 functions when a packet is encrypted and transmitted. The encryption circuit 305 is one example of the cipher processing unit 12. Note that when encryption is performed by software, the CPU 301 functions as the cipher processing unit 12. The CPU 301 reads from the flash memory 303 a program corresponding to the encryption circuit 305 and executes the program.

The sensor 306 detects data specific to the sensor 306. For example, the sensor 306 detects data suited to a measurement target, such as temperature, humidity, water level, precipitation, air quantity, sound volume, power usage, time, time of day, acceleration and the like. Note that CPU 301 acquires a detected value from the sensor 306. Then, the CPU 301 transmits the detected data acquired to other devices, as sensor data.

Figure 21:
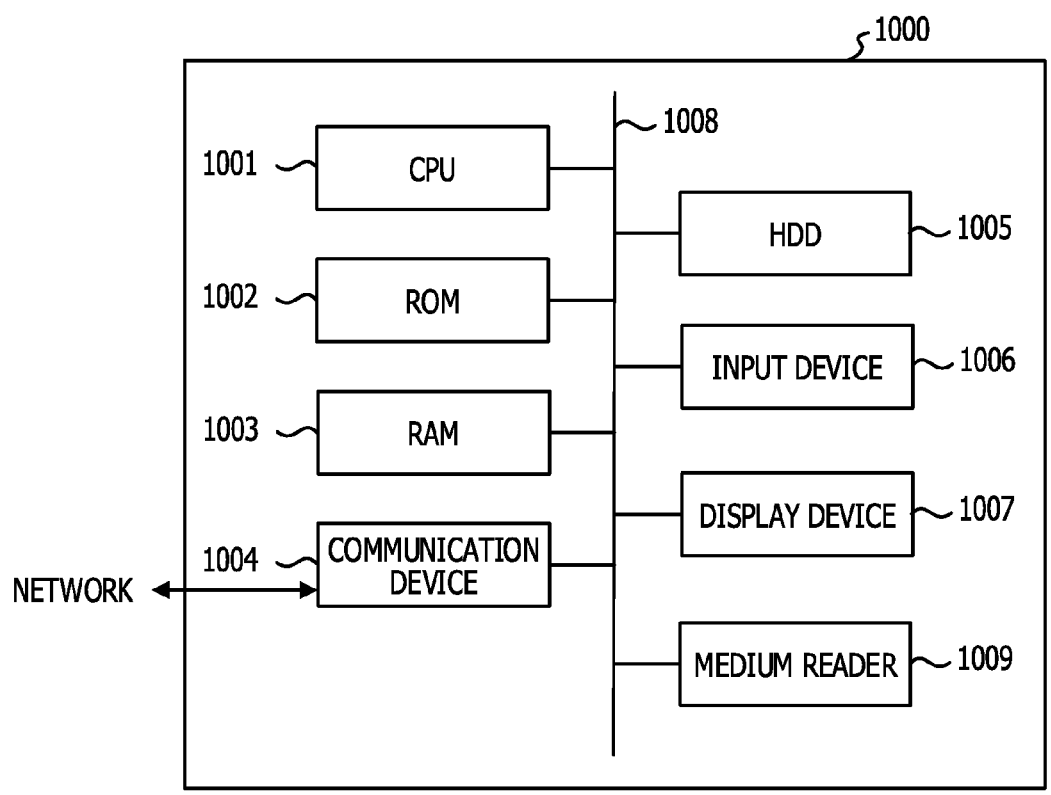
FIG. 21 is a view illustrating one example of hardware configuration of the server S and the management device 40.

FIG. 21 is a view illustrating one example of a hardware configuration of a server S and a management device 40. A computer 1000 functions as a device having functions of the server S or the management device 40 or functions of both the server S and the management device 40.

The computer 1000 has a central processing unit (CPU) 1001, a read only memory (ROM) 1002, a random access memory (RAM) 1003, a communication device 1004, a hard disk drive (HDD) 1005, an input device 1006, a display device 1007, and a medium reader 1009, and each unit is mutually coupled by way of a bus 1008. Then, each unit may transmit or receive data to or from each other under the control of the CPU 1001.

A program in which the process to add illustrated in FIG. 19 is written or the afore-mentioned program for assigning an ID or a pre-shared key is stored in a computer readable recording medium. A computer readable recording medium includes an HDD, a flexible disk (FD), a magnetic tape (MT) and the like. In addition, programs related to the various processes described in this example are recorded in the computer readable recording medium.

An optical disk includes a digital versatile disk (DVD), a DVD-RAM, a compact disk-read only memory (CD-ROM), a CD-R (Recordable)/RW (ReWritable) and the like. A magnetooptical medium includes a magnetooptical disk (MO) and the like. To distribute this medium, it is possible that a portable recording medium in which that program is recorded, such as a DVD, a CD-ROM and the like, is sold.

In the computer 1000, from a recording medium in which various types of programs are recorded, a medium reader 1009 reads the program. Note that the computer 1000 functions as the server S or the management device 40 by executing the read program. The CPU 1001 stores the read program in the HDD 1005, the ROM 102, or the RAM 1003.

The CPU 1001 is a central processing unit which takes control of the entire operations of the server S or the management device 40. The HDD 1005 stores a program for causing the computer to perform each process, as a program for causing the computer to serve similar functions to the server S or the management device 40 illustrated in each example described above.

Then, by reading the program from the HDD 1005 ad executing the program, the CPU 1001 functions as the ID generation unit 42, the key generation unit 43, and the determination unit 44 in the management device 40 illustrated in FIG. 12. The CPU 1001 also functions as the updating unit 52 and the notice generation unit 53 in the server S illustrated in FIG. 14. In addition, various programs may be stored in the ROM 1002 or the RAM 1003 to which the CPU 1001 is accessible.

Furthermore, under the control of the CPU 1001, the HDD 1005 functions as the management table memory unit 45 or the range information memory unit 46 illustrated in FIG. 12. The HDD 1005 also functions as the range information memory unit 54 or the management table memory unit 55 illustrated in FIG. 14. Similar to the programs, information in the memory units may be stored in the ROM 1002 or the RAM 1003 to which the CPU 1001 is accessible. In addition, the ROM 1002 or the RAM 1003 stores information which is temporarily generated in the course of processing. The display device 1007 displays each screen, as appropriate.

The communication device 1004 receives a signal from other device by way of a network and passes content of that signal to the CPU 1001. The communication device 1004 further transmits a signal to other device by way of the network, depending on an instruction from the CPU 1001. The input device 1006 accepts entry of information from a user.

The ad-hoc network in this example is applied to a system for collecting power usage of households, for example. In such a system, each node N is installed in a wattmeter of each household for detecting power usage of each household. The power usage detected by each node N being transmitted to the server S by way of the sink node SN, it becomes possible for the server S to collect power usage of each household.

For example, suppose that the node N is incorporated in each wattmeter of each household. Each node N transmits power usage of each household to the server S by way of the ad-hoc network 100.

Note that ach node may gauge power usage of each household or each node may acquire from the wattmeter. In addition, each node stores the detected power usage in its own storage area. The sink node SN transmits the power usage of each household received from each node in the ad-hoc network 100 to the server S of the power company by way of the regular network 200. This enables collection of power usage without dispatching an operator on site (each household).

In addition, this network system enables each node to be used in a survey of the environment, for example, as well as collection of power usage, by causing each node to have a sensor function to detect temperature, humidity, amount of light and the like.

(Variation 1)

In this example, when a node (x, y) and a node (u, v) share a common key, a node (x, v) or (u, y) which is likely to have as few number of hops as possible is determined as a relay node. However, without being limited to this example, an own node and a counterpart node may share a common key by way of a plurality of relay nodes.

For example, when a certain node (x, y) shares a common key with a counterpart node (u, v), the node (x, y) determines that a node to which an ID (x, p) is assigned is a relay node. Here, "p" is an integer other than "y" and within a range of second element values which each node in a network system may take.

Then, the first relay node (x, p) determines that a node to which an ID (q, v) is assigned is a second relay node, for example. Here, "q" is an integer other than "u" and within a range of first element values which each node in a network system may take. Since the second relay node (q, v) has a pre-shared key Lv which is common to the counterpart node (u, v), the second relay node (q, v) uses the pre-shared key Lv to re-encrypt the common key which the certain node (x, y) generates.

In addition, the determination unit 13 of the node (x, y) requests a node (x, v) or a node (u, y) to be a relay to the counterpart node (u, v). If the determination unit 13 does not receive a response the request for a predetermined period of time, the determination unit 13 may determine the relay node (x, p). Here, "p" is an integer other than "v" or "y".

(Variation 2)

Double encryption may be performed on a data packet. For example, encryption in an application layer uses a common key shared with a global transmission destination or a pre-shared key, while encryption in an ad-hoc layer may use an access key shared by a local transmission destination and a local transmission source.

In each communication which constitutes a transfer path, each node performs re-encryption in the ad-hoc layer. Furthermore, at the global transmission destination, which is an end point of the transfer path, decryption in the d-hoc layer is performed with an access key which is shared with a last transmission source. In addition, decryption in the application layer is performed with the common key shared with the global transmission source or the pre-shared key.

As such, use of an access key enables evaluation of validity of a packet among nodes which constitute a transfer path, thus improving the security.

(Variation 3)

In the example of FIG. 2, while a configuration is such that one sink node SN is provided in the ad-hoc network 100, more than one sink node SN may be provided in one ad-hoc network 100. In addition, in the example of FIG. 2, while the network system is one ad-hoc network 100, more than one ad-hoc network may be included. When a plurality of ad-hoc networks are included, each ad-hoc network includes at least one sink node SN. In this case, the server S is coupled with each sink node SN by way of a regular network. This configuration enables transmission or reception of data between the server S and all nodes N.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A node device of a plurality of node devices included in a network system, the node device comprising:
   a memory that stores identification information used to identify the node device, the identification information including a first element having a first value and a first pre-shared key associated with the first value and a second element having a second value and a second pre-shared key associated with the second value;
   a processor coupled to the memory and configured to read the memory to perform a process including:
      determine a destination node device among the plurality of node devices to which a packet is to be transmitted,
      compare the first value of the node device with a first value of the destination node device and compare the second value of the node device with a second value of the destination node device,
      when either the first value of the node device is equal to the first value of the destination node device or the second value of the node device is equal to the second value of the destination node device, determine that one of the first pre-shared key and the second pre-shared key is in common with a pre-shared key of the destination node device and perform control to transmit the packet to the destination node device using a common key, and
      when neither the first value of the node device is equal to the first value of the destination node device nor the second value of the node device is equal to the second value of the destination node device, identify a relay node device among the plurality of node devices, the relay node device having either a first value of the relay device that is equal to the first value of the node device and a second value of the relay device that is equal to the second value of the destination node device or a first value of the relay device that is equal to the first value of the destination node device and a second value of the relay device that is equal to the second value of the node device, and perform control to transmit the packet to the relay node device using a common key.

2. The node device according to claim 1, wherein the processor is configured to:
   update the identification information in the memory when receiving a notice indicating that the first value or the second value has been changed from a device managing the network system.

3. The node device according to claim 1, wherein the processor is configured to:
   transmit to the destination node device the common key to perform an encrypted communication between the node device and the destination node device using one of the first pre-shared key and the second pre-shared key.

4. The node device according to claim 1, wherein the processor is configured to:
   determine the relay node device identified with the first value related to the first element and a fourth value related to the second element when sharing a common key with a sharing destination node device identified with a third value related to the first element and the fourth value related to the second element, and
   transmit the common key encrypted with the first pre-shared key to the relay node device.

5. The node device according to claim 4, wherein the processor is configured to:
   generate the common key shared with the sharing destination node device.

6. A communication method in a network system including a plurality of node devices, the method comprising:
   storing, in a memory, identification information used to identify a node device among the plurality of node devices, the identification information including a first element having a first value and a first pre-shared key associated with the first value and a second element having a second value and a second pre-shared key associated with the second value;
   determining a destination node device among the plurality of node devices to which a packet is to be transmitted;
   comparing the first value of the node device with a first value of the destination node device and comparing the second value of the node device with a second value of the destination node device;
   when either the first value of the node device is equal to the first value of the destination node device or the second value of the node device is equal to the second value of the destination node device, determining that one of the first pre-shared key and the second pre-shared key is in common with a pre-shared key of the destination node device and performing control to transmit the packet to the destination node device using a common key; and
   when neither the first value of the node device is equal to the first value of the destination node device nor the second value of the node device is equal to the second value of the destination node device, identifying a relay node device among the plurality of node devices, the relay node device having either a first value of the relay device that is equal to the first value of the node device and a second value of the relay device that is equal to the second value of the destination node device or a first value of the relay device that is equal to the first value of the destination node device and a second value of the relay device that is equal to the second value of the node device, and performing control to transmit the packet to the relay node device using a common key.

7. The communication method according to claim 6, further comprising:
   receiving from a device managing the network system a notice indicating that one of the first value and the second value has been changed; and
   updating the identification information stored in the memory unit based on the notice.

8. The communication method according to claim 6, further comprising:
   transmitting to the destination node device the common key to perform an encrypted communication between the node device and the destination node device using the first pre-shared key.

9. The communication method according to claim 6, further comprising:
   determining the relay node device identified with the first value related to the first element and a fourth value related to the second element when a common key is shared with a sharing destination node device identified with a third value related to the first element and the fourth value related to the second element; and transmitting the common key encrypted with the first pre-shared key to the relay node device.

10. The communication method according to claim 9, further comprising:
generating the common key shared with the sharing destination node device.

11. A network system comprising:
a plurality of node devices including a first node device, wherein the first node device includes:
a memory that stores identification information used to identify the first node device, the identification information including a first element having a first value and a first pre-shared key associated with the first value and a second element having a second value and a second pre-shared key associated with the second value, and
a processor, the processor of the first node device being configured to:
determine a second node device among the plurality of node devices to which a packet is to be transmitted;
compare the first value of the first node device with a first value of the second node device and compare the second value of the first node device with a second value of the second node device,
when either the first value of the first node device is equal to the first value of the second node device or the second value of the first node device is equal to the second value of the second node device, determine that one of the first pre-shared key and the second pre-shared key is in common with a pre-shared key of the second node device and perform control to transmit the packet to the second node device using a common key; and
when neither the first value of the first node device is equal to the first value of the second node device nor the second value of the first node device is equal to the second value of the second node device, identify a relay node device among the plurality of node devices, the relay node device having either a first value of the relay device that is equal to the first value of the first node device and a second value of the relay device that is equal to the second value of the second node device or a first value of the relay device that is equal to the first value of the second node device and a second value of the relay device that is equal to the second value of the first node device, and perform control to transmit the packet to the relay node device using a common key.

12. The system according to claim 11, further comprising:
a management device configured to manage the network system,
wherein the processor of the first node device is configured to update the identification information in the memory when receiving a notice indicating that the first value or the second value has been changed from the management device.

13. The system according to claim 11, wherein
the processor of the first node device is configured to transmit to the second node device the common key to perform an encrypted communication between the first node device and the second node device using one of the first pre-shared key and the second pre-shared key.

14. The system according to claim 11, wherein
the processor of the first node device is configured to:
determine the relay node device identified with the first value related to the first element and a fourth value related to the second element when sharing a common key with a sharing destination node device identified with a third value related to the first element and the fourth value related to the second element, and
transmit the common key encrypted with the first pre-shared key to the relay node device.

15. The system according to claim 14, wherein
the processor of the first node device is configured to generate the common key shared with the sharing destination node device.

* * * * *